US011490121B2

United States Patent
Ooi

(10) Patent No.: US 11,490,121 B2
(45) Date of Patent: Nov. 1, 2022

(54) TRANSFORM DEVICE, DECODING DEVICE, TRANSFORMING METHOD, AND DECODING METHOD

(71) Applicant: Panasonic Intellectual Property Management Co., Ltd., Osaka (JP)

(72) Inventor: Kenji Ooi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/196,299

(22) Filed: Mar. 9, 2021

(65) Prior Publication Data

US 2021/0195243 A1    Jun. 24, 2021

Related U.S. Application Data

(63) Continuation of application No. PCT/JP2019/026648, filed on Jul. 4, 2019.

(30) Foreign Application Priority Data

Sep. 12, 2018 (JP) .............................. JP2018-170854

(51) Int. Cl.
*H04N 19/60* (2014.01)
*H04N 19/12* (2014.01)
*H04N 19/159* (2014.01)
*H04N 19/172* (2014.01)

(52) U.S. Cl.
CPC ............. *H04N 19/60* (2014.11); *H04N 19/12* (2014.11); *H04N 19/159* (2014.11); *H04N 19/172* (2014.11)

(58) Field of Classification Search
CPC ........ H04N 19/60; H04N 19/12; H04N 19/159
USPC ..................................................... 375/240.18
See application file for complete search history.

(56) References Cited

U.S. PATENT DOCUMENTS

2009/0060032 A1* 3/2009 Schmit ................... H04N 19/40
375/240.01
2012/0236111 A1    9/2012 Halavy et al.

FOREIGN PATENT DOCUMENTS

| JP | 2000-13791 | 1/2000 |
|----|------------|--------|
| JP | 3380981    | 2/2003 |
| JP | 2013-42492 | 2/2013 |
| WO | 2010/027082 | 3/2010 |

OTHER PUBLICATIONS

International Search Report (ISR) dated Aug. 20, 2019 in International (PCT) Application No. PCT/JP2019/026648.
Recommendation ITU-T H.265, "Audiovisual and Multimedia Systems Infrastructure of audiovisual services—Coding of moving video," Feb. 2018.

(Continued)

*Primary Examiner* — On S Mung
(74) *Attorney, Agent, or Firm* — Wenderoth, Lind & Ponack L.L.P.

(57) ABSTRACT

An acquisition unit capable of providing more flexible services includes an acquisition unit that acquires a first stream; a transformer that transforms a first picture included in the first stream into a second picture, the first picture being irreversibly encoded, the second picture being reversibly encoded; and an output unit that outputs a second stream including the second picture.

13 Claims, 12 Drawing Sheets

(56) References Cited

OTHER PUBLICATIONS

Setton et al., "Rate-Distortion Analysis and Streaming", IEEE Transactions On Circuits and Systems for Video Technology, vol. 16, No. 6, Jun. 2006, pp. 733-743, XP001548826.
Extended European Search Report dated Oct. 8, 2021 for the European Patent Application No. 19859227.1.
Setton et al., "Rate-Distortion Analysis and Streaming of SP and SI Frames", IEEE Transactions on Circuits and Systems for Video Technology, vol. 16, No. 6, Jun. 2006, pp. 733-743, XP001548826.
Karczewicz et al., "A Proposal for SP-frames", ITU—Telecommunications Standardization Sector, Study Group 16 Question 6, Video Coding Experts Group (VCEG), Document: VCEG-L27, Jan. 2001, XP030003172.
Su et al., "A Dynamic Video Streaming Scheme Based on SP/SI Frames of H.264/AVC", 2012 41st International Conference on Parallel Processing Workshops, Sep. 2012, pp. 524-529, XP032265731.
Karczewicz et al., "The SP- and SI-Frames Design for H.264/AVC", IEEE Transactions on Circuits and Systems for Video Technology, vol. 13, No. 7, Jul. 2003, pp. 637-644. XP011099256.

\* cited by examiner

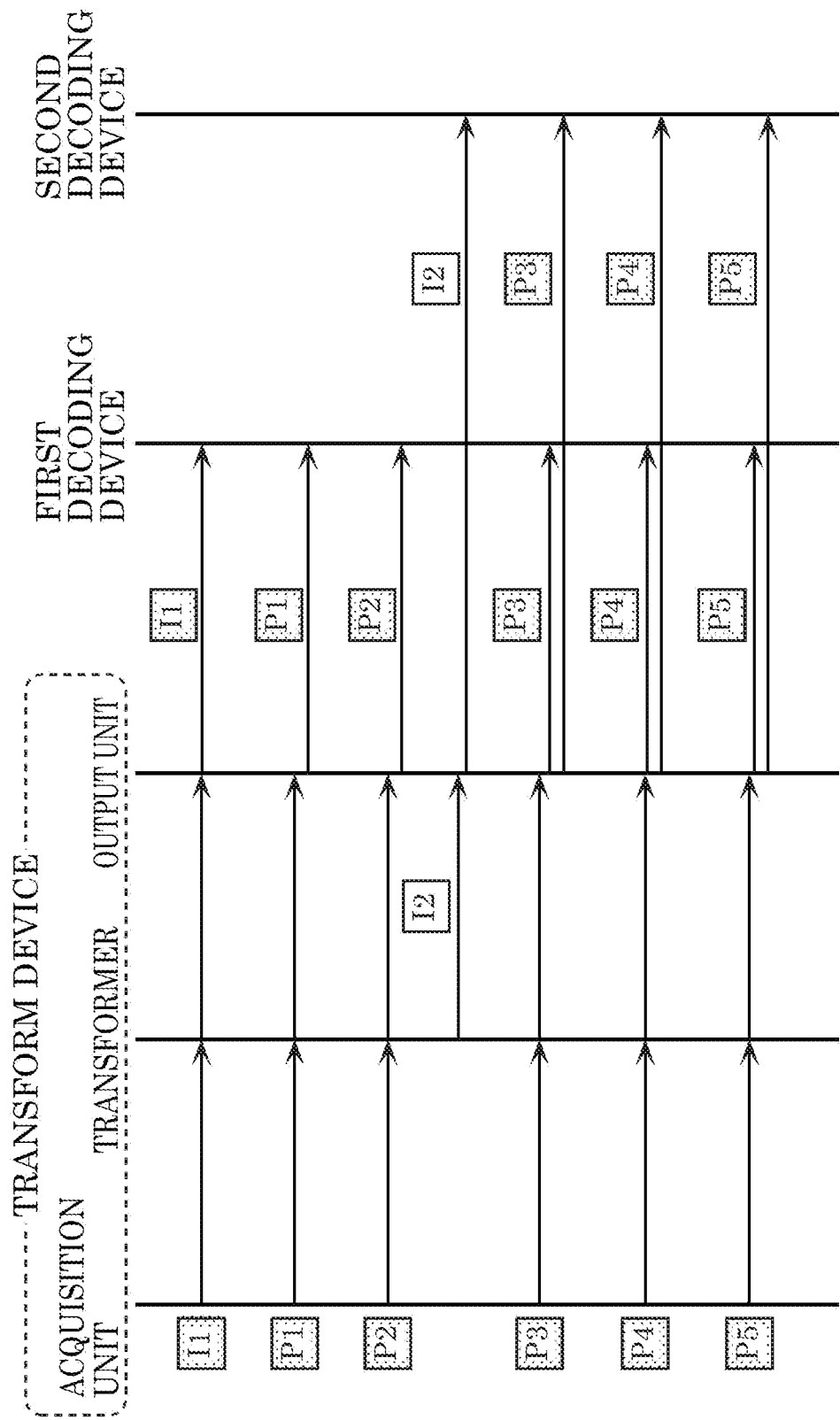

TRANSFORM DEVICE, DECODING DEVICE, TRANSFORMING METHOD, AND DECODING METHOD

CROSS REFERENCE TO RELATED APPLICATIONS

This application is a U.S. continuation application of PCT International Patent Application Number PCT/JP2019/026648 filed on Jul. 4, 2019, claiming the benefit of priority of Japanese Patent Application Number 2018-170854 filed on Sep. 12, 2018, the entire contents of which are hereby incorporated by reference.

BACKGROUND

1. Technical Field

The present disclosure relates to a device and a method for encoding, decoding, or transforming a moving image, for example.

2. Description of the Related Art

In a moving image encoding process, in general, an inter-picture prediction (referred to as an inter-prediction hereinafter) encoding process is used which compresses the amount of information by taking advantage of the redundancy in the temporal direction of moving images. In the inter-prediction encoding process, when encoding a picture, an encoded picture that is different from that picture (referred to as a picture to be encoded hereinafter) is used as a reference picture. A motion vector is determined by detecting a motion of the picture to be encoded with respect to the reference picture. Furthermore, the difference between a prediction picture obtained by motion compensation based on the motion vector and the picture to be encoded is determined to remove the redundancy in the temporal direction. In the motion detection, the value of the difference between a block to be encoded in the picture to be encoded and each block in the reference picture is calculated, and the block in the reference picture for which the minimum difference value is calculated is searched for as a reference block. The motion vector is detected by using the block to be encoded and the reference block.

In the moving image encoding process, in general, the inter-prediction encoding process and an intra-picture prediction (referred to as an intra prediction hereinafter), which uses no reference picture, are used in combination. Representative moving image encoding schemes include a moving image encoding scheme referred to as H.265 or High Efficiency Video Coding (HEVC) (see Recommendation ITU-T H.265, "AUDIOVISUAL AND MULTIMEDIA SYSTEMS Infrastructure of audiovisual services—Coding of moving video", February, 2018).

The moving image encoding process is used when one video is transmitted to a plurality of terminals in applications such as a surveillance camera or a videoconference system or when a video is recorded in a storage medium.

SUMMARY

When the moving image encoding process described above is simply used for transmitting a moving image from a surveillance camera, for example, there is a problem that it is difficult to provide a flexible service.

The present disclosure provides a transform device for transforming a stream, which is an encoded moving image, to another stream that can provide a more flexible service.

A transform device in accordance with an aspect of the present disclosure includes: an acquisition unit that acquires a first stream; a transformer that transforms a first picture included in the first stream into a second picture, the first picture being irreversibly encoded, the second picture being reversibly encoded; and an output unit that outputs a second stream including the second picture.

General or specific aspects of the present disclosure may be implemented to a system, a method, an integrated circuit, a computer program, a computer-readable recording medium such as a Compact Disc-Read Only Memory (CD-ROM), or any given combination thereof. The computer-readable recording medium may be a non-transitory recording medium.

The transform device according to the present disclosure can provide a more flexible service.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 is a sequence diagram showing an example of a process performed by each component of the transform device according to Embodiment 1;

DETAILED DESCRIPTION OF THE EMBODIMENTS

Figure 1:
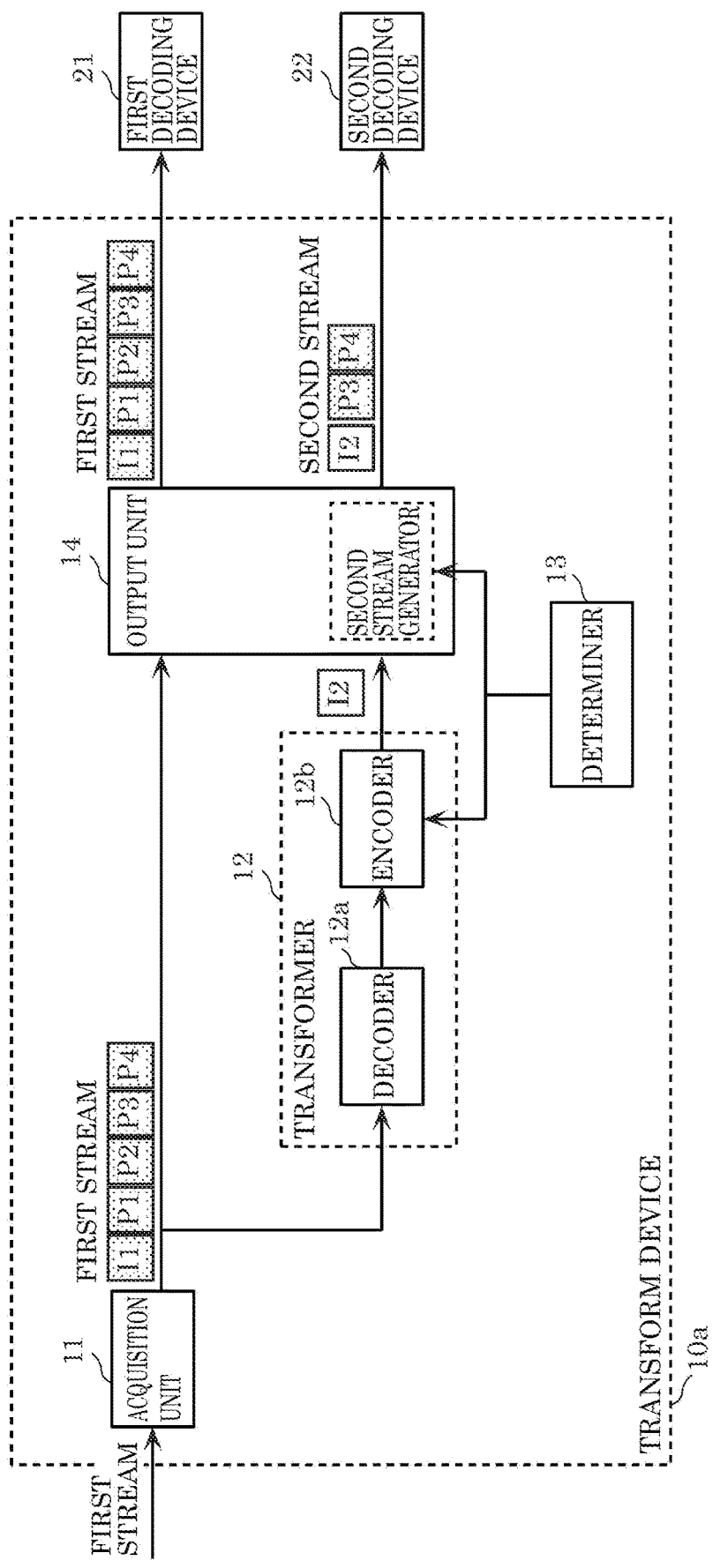
FIG. 1 is a diagram showing a configuration of a transform device according to Embodiment 1.

Findings on which Present Disclosure is Based

The inventor has found the following problems concerning applications of the moving image encoding process described in "BACKGROUND ART".

For example, an application example of the moving image encoding process is a surveillance camera or other systems that perform an encoding process on a moving image and transmits the encoded moving image, that is, a stream, to a plurality of terminals for reproduction. The plurality of terminals reproduce the moving image in streaming. In the case of such a system, if a second terminal requests for transmission of a stream while a first terminal is reproducing the stream, the reproduction of the stream by the second terminal can lag.

For example, the second terminal requests for reproduction of the stream from an inter-prediction encoded picture in a group of pictures (GOP) included in the stream. That is, at the timing when the request for reproduction is received, the inter-prediction encoded picture is transmitted among the pictures included in the stream. Specifically, the picture is a predictive picture (P picture) or a bidirectionally predictive picture (B picture), for example.

However, even if the inter-prediction encoded picture and the following pictures of the stream are transmitted to the second terminal in response to the request, the second terminal cannot decode the inter-prediction encoded picture. This is because the second terminal has not previously decoded a picture that is to be referred to decode the inter-prediction encoded picture. Therefore, the second terminal has to wait without reproducing the stream until an instantaneous decoding refresh (IDR) picture in the stream is transmitted. Thus, it is difficult to achieve efficient random access.

In order to eliminate such a lag in the reproduction, it is possible to transform the inter-prediction encoded picture into an intra-prediction encoded picture. In this case, a stream including an intra-prediction encoded picture instead of the inter-prediction encoded picture is transmitted to the second terminal. As a result, the second terminal can decode the pictures included in the stream from the intra-prediction encoded picture. However, there is a problem that the image quality of the decoded images of the pictures following the intra-prediction encoded picture decreases. This is because the original picture included in the stream is an irreversibly inter-prediction encoded picture, and the decoded image of that picture is further irreversibly intra-prediction encoded in the transformation described above. As a result, the image quality of the pictures decoded by referring to the decoded image of the intra-prediction encoded picture decreases. More specifically, the video of the intra-prediction encoded picture and the following pictures included in the stream is disturbed.

Alternatively, in order to eliminate the lag in the reproduction, or in other words, in order to achieve efficient random access, it is possible to insert an IDR picture in the stream and transmit the stream with the IDR picture inserted to the second terminal. In this case, however, transmitting the stream leads to an increase of the load on the network.

Alternatively, in order to eliminate the lag in the reproduction, or in other words, in order to achieve efficient random access, it is possible to provide the surveillance cameras or the like with an encoding device compatible with the terminals. In this case, however, the number of the terminals that can reproduce the stream at the same time is limited to the number of the encoding device.

Therefore, a transform device in accordance with an aspect of the present disclosure includes: an acquisition unit that acquires a first stream; a transformer that transforms a first picture included in the first stream into a second picture, the first picture being irreversibly encoded, the second picture being reversibly encoded; and an output unit that outputs a second stream including the second picture. For example, the transformer may transform the first picture into the second picture by decoding the first picture to generate a decoded image of the first picture and reversibly encoding the decoded image of the first picture. The reversible encoding is an encoding according to H.264 Lossless or H.265 Lossless, which are extensions of the moving image encoding standard H.264 or H.265, respectively, for example.

With this configuration, for example, when the terminal requests transmission of the first picture and the following pictures included in the first stream while the first stream is being transmitted, the second stream including the second picture, which is a reversibly encoded picture, rather than an irreversibly encoded picture, is transmitted to the terminal. As a result, the terminal can appropriately decode the second picture and the following pictures included in the second stream, and can reduce the image quality degradation of the decoded images. Therefore, efficient random access can be achieved and a more flexible service can be provided without increasing the load on the network and causing a limitation on the number of the terminals that can reproduce the stream at the same time.

It is possible that the output unit: outputs the second stream further including a third picture that included in the first stream, the third picture being located subsequent to the second picture in a decoding order in the second stream, the third picture being encoded with reference to a decoded image of the first picture.

With this configuration, even if the encoding scheme for the third picture is not changed, the terminal receiving the second stream can appropriately decode the third picture by referring to the decoded image of the second picture.

It is also possible that the output unit further outputs the first stream acquired by the acquisition unit.

With this configuration, while the first stream is being transmitted to the first terminal, the second stream can be transmitted to the second terminal in response to a request from the second terminal.

It is further possible that the transform device further includes: a determiner that determines, for each of a plurality of pictures included in the first stream, whether or not to change an encoding scheme for the picture, wherein the transformer transforms the first picture into the second picture, the first picture being a picture for which the determiner determines to change an encoding scheme. For example, it is possible that the determiner determines to change an encoding scheme for each of one or more consecutive pictures including the first picture among the plurality of pictures included in the first stream, the first picture corresponding to a timing of receiving a stream transmission request.

With this configuration, the encoding scheme for a picture can be changed at an appropriate timing, and reproduction of the second stream can be started by reducing the lag from the transmission request.

It is still further possible that the determiner determines not to change an encoding scheme for each of pictures subsequent to the one or more consecutive pictures among the plurality of pictures included in the first stream.

With this configuration, the load of the change of the encoding scheme can be reduced.

It is still further possible that the transformer intra-prediction encodes the decoded image of the first picture to transform the first picture into the second picture.

With this configuration, since the second picture is a reversibly encoded I picture, the terminal can decode the second stream from the top thereof without referring to the decoded image even if the second picture is arranged at the top of the second stream. In addition, by changing the encoding scheme for the first picture of the pictures included in the first stream, changing of the encoding scheme for the other pictures can be omitted.

It is still further possible that the transformer further: decodes a fourth picture to generate a decoded image of the fourth picture, the fourth picture being included in the first stream and being irreversibly inter-prediction encoded; irreversibly intra-prediction encodes the decoded image of the fourth picture to transform the fourth picture into a fifth picture; and in the transforming of the first picture into the second picture, reversibly inter-prediction encodes the decoded image of the first picture with reference to a decoded image of the fifth picture to transform the first picture into the second picture, the first picture being inter-prediction encoded with reference to the decoded image of the fourth picture, and the output unit outputs the second stream including the fifth picture and the second picture.

With this configuration, the fourth picture and the first picture included in the first stream are transformed into the fifth picture and the second picture included in the second stream. For example, the fourth picture that is an irreversibly encoded P picture and the first picture that is an irreversibly encoded P picture are transformed into the fifth picture that is an irreversibly encoded I picture and the second picture that is a reversibly encoded P picture, respectively.

For example, an I picture reversibly encoded has a large code amount, and transmitting the I picture can lead to an increase of the load on the network. However, according to this aspect, the second picture is not formed as a reversibly encoded I picture but as a reversibly encoded P picture (or B picture). In addition, since the fourth picture, which is an irreversibly encoded P picture, is transformed into the fifth picture, which is an irreversibly encoded I picture, the overall bit rate of the stream can be reduced, although the code amount of each picture may increase.

It is still further possible that the transformer further: decodes the first picture to generate the decoded image of the first picture, the first picture being included in the first stream and being irreversibly inter-prediction encoded; irreversibly intra-prediction encodes the decoded image of the first picture to transform the first picture into a fourth picture; and in the transforming of the first picture into the second picture, reversibly inter-prediction encodes the decoded image of the first picture with reference to a decoded image of the fourth picture to transform the first picture into the second picture, and the output unit outputs the second stream including the fourth picture and the second picture.

With this configuration, the first picture included in the first stream is transformed into the fourth picture and the second picture included in the second stream. For example, the first picture that is an irreversibly encoded P picture is transformed into the fourth picture that is an irreversibly encoded I picture and the second picture that is a reversibly encoded P picture.

For example, an I picture reversibly encoded has a large code amount, and transmitting the I picture can lead to an increase of the load on the network. However, according to this aspect, the second picture is not formed as a reversibly encoded I picture but as a reversibly encoded P picture (or B picture). In addition, since the fourth picture and the second picture are generated by transformation of the same first picture, the images of the fourth picture and the second picture are similar to each other. As a result, the decoded image of the fourth picture is referred to when transforming the first picture into the second picture, and therefore, the code amount of the second picture can be reduced. As a result, the overall bit rate of the stream can be reduced.

Furthermore, a decoding device in accordance with another aspect of the present disclosure includes: a receiver that receives a second stream including a second picture; a decoder that decodes the second stream to generate video signal; and a display unit that displays a video in accordance with the video signal, wherein the second picture is a reversibly encoded picture generated by transforming a first picture included in a first stream, the first picture being irreversibly encoded.

With this configuration, when transmission of the first picture and the following pictures included in the first stream is requested while the first stream is being transmitted, the receiver receives the second stream including the second picture, which is a reversibly encoded picture, rather than an irreversibly encoded picture. As a result, the decoder can appropriately decode the second picture and the following pictures included in the second stream, and the image quality degradation of the decoded image can be reduced.

General or specific aspects of the present disclosure may be implemented to a system, a method, an integrated circuit, a computer program, a computer-readable recording medium such as a Compact Disc-Read Only Memory (CD-ROM), or any given combination thereof. The computer-readable recording medium may be a non-transitory recording medium.

Hereinafter, certain exemplary embodiments will be described in detail with reference to the accompanying Drawings.

The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

It should be noted that the respective figures are schematic diagrams and are not necessarily precise illustrations. Additionally, components that are essentially the same share like reference signs in the figures.

Embodiment 1

FIG. 1 is a diagram showing a configuration of a transform device according to Embodiment 1.

Transform device 10a according to this embodiment outputs a first stream including first encoded data obtained by encoding a first frame and a second stream including second encoded data obtained by transcoding the first encoded data. For example, transform device 10a outputs the first stream to first decoding device 21 and outputs the second stream to second decoding device 22.

Note that, in the present disclosure, frame and picture are synonymous with each other. In addition, frame or picture may mean the encoded one or the one yet to be encoded. However, when explicitly referring to the encoded one, the frame or picture that is encoded is referred to as encoded data.

The first encoded data described above is not encoded data located at the top of the first stream but is encoded data located in the middle of the first stream. Note that a stream includes a plurality of pieces of encoded data arranged in the decoding or encoding order from the top of the stream. A plurality of pieces of encoded data included in the first stream are data obtained by irreversible encoding of a frame or a picture.

Transform device 10a according to this embodiment allows first decoding device 21 to start the decoding of the first stream from the encoded data at the top thereof and second decoding device 22 to start the decoding of the second stream from the second encoded data that corresponds to the first encoded data in the middle of the first stream. The second encoded data may be an I picture obtained by transcoding the first encoded data that is a P picture by reversible encoding. With this configuration, second decoding device 22 may be able to decode encoded data following the second encoded data (that is, the encoded first frame) without transcoding the following encoded data.

As shown in FIG. 1, transform device 10a includes acquisition unit 11, determiner 13, transformer 12, and output unit 14, and is connected to first decoding device 21 and second decoding device 22. Transform device 10a acquires a first stream, and outputs the first stream to first decoding device 21. Transform device 10a also transforms the first stream into a second stream, and outputs the second stream to second decoding device 22. First decoding device 21 decodes the first stream, and second decoding device 22 decodes the second stream. Note that transform device 10a may be connected to first decoding device 21 and second decoding device 22 over a network.

Acquisition unit 11 acquires the first stream including first encoded data, and outputs the first stream to output unit 14 and transformer 12. The first encoded data is intra-frame encoded data (that is, an I picture) or inter-frame encoded data (that is, a P picture or a B picture). The intra-frame encoded data is a frame or picture encoded by intra-picture prediction, that is, intra prediction, and the inter-frame encoded data is a frame or picture encoded by inter-picture prediction, that is, inter-prediction. FIG. 1 shows an example of the first stream and the second stream. "I1" and "I2" represent encoded data of an I picture, and "P1" to "P4" represent encoded data of a P picture.

Transformer 12 transcodes the first encoded data. Transformer 12 includes decoder 12a and encoder 12b. Decoder 12a decodes the first encoded data to generate a decoded image. Encoder 12b encodes the decoded image to transcode the first encoded data into the second encoded data. The encoding performed by encoder 12b is referred to also as re-encoding.

Determiner 13 determines whether to transcode each of the encoded data included in the first stream. When transform device 10a receives a request signal for starting decoding from second decoding device 22, determiner 13 may determine to transcode one or more pieces of encoded data to be transmitted after the request signal is received. For example, determiner 13 determines to transcode the first encoded data to be transmitted after (specifically, immediately after) the request signal is received. Note that determiner 13 may determine to transcode a portion of the first stream up to the next I picture included in the first stream after the request signal is received. Note that the next I picture is the first I picture to be transmitted from transform device 10a after the time when the request signal is received.

Output unit 14 outputs the first stream to first decoding device 21 and the second stream to second decoding device 22. That is, the first stream and the second stream are sent or transmitted. The second stream includes the second encoded data and one or more pieces of encoded data following the second encoded data. Specifically, output unit 14 generates the second stream by combining a second frame and one or more frames following the second frame with each other and adding control information thereto.

FIG. 2 is a sequence diagram showing an example of a process performed by each component of transform device 10a according to this embodiment.

As shown in FIG. 2, acquisition unit 11 of transform device 10a acquires encoded data IL encoded data P1, encoded data P2, encoded data P3, and encoded data P4 in the order listed above. That is, acquisition unit 11 acquires the first stream including these pieces of encoded data arranged in the order listed above. Encoded data I1 is encoded data of the first I picture, and encoded data Pn (n represents any of integers 1 to 5) is encoded data of the n-th P picture. The P picture (or encoded data Pn) is encoded by referring to the preceding encoded data. In the example shown in FIG. 2, first decoding device 21 decodes all the encoded data included in the first stream, and second decoding device 22 requests transform device 10a to transmit encoded data P2 and the following encoded data included in the first stream. In other words, first decoding device 21 requests transform device 10a to reproduce the first stream from the encoded data at the top thereof, and second decoding device 22 requests transform device 10a to reproduce the first stream from encoded data at a midpoint thereof. Such requests are transmitted to transform device 10a in the form of a request signal.

As shown in FIG. 2, each time acquisition unit 11 acquires encoded data, acquisition unit 11 outputs the encoded data to output unit 14 and transformer 12. Decoder 12a of transformer 12 decodes the encoded data output from acquisition unit 11 to generate a decoded image corresponding to the encoded data.

Determiner 13 determines not to transcode the encoded data sequentially input to transformer 12 before the request from second decoding device 22 is received, for example. Output unit 14 transmits the first stream to first decoding device 21 but does not transmit the second stream to second decoding device 22 until the request from second decoding device 22 is received, for example.

That is, as described above, when second decoding device 22 requests for transmission of encoded data P2 and the following encoded data included in the first stream, determiner 13 determines not to transcode encoded data I1 and encoded data P1. In other words, determiner 13 determines not to start generation of the second stream. And output unit 14 transmits encoded data I1 and encoded data P1 to first decoding device 21 as encoded data included in the first stream.

When the request from second decoding device 22 is received, determiner 13 determines to transcode encoded data P2 included in the first stream. In other words, determiner 13 determines to start generation of the second stream. Determiner 13 then transmits a direction signal for re-encoding of encoded data P2 to encoder 12b.

In response to the direction signal, encoder 12b encodes the decoded image of encoded data P2 generated by decoder 12a. In this encoding, a reversible intra prediction is used. Encoder 12b generates encoded data I2, which is reversibly intra-frame encoded data, and outputs encoded data I2 to output unit 14. In this way, transformer 12 transforms irreversibly encoded data P2 into reversibly encoded data I2. In other words, an irreversible P picture is transformed into a reversible I picture.

The reversible encoding is an encoding according to H.264 Lossless or H.265 Lossless, which are extensions of the moving image encoding standard H.264 or H.265, respectively, for example. When quantization is performed in the encoding, the reversible encoding may be an encoding in which the quantization width for the quantization is 1. Encoded data P2 is the first encoded data described above, and encoded data I2 is the second encoded data described above.

Output unit 14 outputs encoded data P2 to first decoding device 21 as encoded data included in the first stream, and outputs encoded data I2 to second decoding device 22 as encoded data included in the second stream.

When encoded data P3 and the following encoded data are input to transformer 12, determiner 13 determines not to transcode the encoded data.

Following the output of encoded data P2, output unit 14 also outputs encoded data P3 and the following encoded data to first decoding device 21 as encoded data included in the first stream. In this way, the first stream is output from output unit 14 to first decoding device 21.

According to the result of the determination by determiner 13 described above, output unit 14 further outputs encoded data P3 and the following encoded data to second decoding device 22 as encoded data included in the second stream without changing the encoding scheme for the encoded data. In this way, the second stream including encoded data I2 as well as encoded data P3 and the following encoded data of the first stream is generated by output unit 14 and output to second decoding device 22. The second stream does not include encoded data I1 and P1 of the first stream.

With this configuration, second decoding device 22 can substantially start decoding of the first stream from encoded data P2 by decoding the second stream.

When the decoded image of encoded data P2 is encoded into encoded data I2 in an irreversible compression scheme, the encoded data following encoded data I2 in the second stream is decoded by referring to the decoded image of encoded data I2. Therefore, the video displayed by reproducing the second stream may be disturbed. That is, an image quality degradation may occur.

For this reason, encoder 12b according to this embodiment encodes the decoded image of encoded data P2 into encoded data I2 in a reversible compression scheme. This can reduce the disturbance of the video. Note that, in the present disclosure, an encoding according to a reversible compression scheme is referred to also as a reversible encoding, and an encoding according to an irreversible compression scheme is referred to also as an irreversible encoding. In addition, a reversible compression scheme is referred to simply as reversible, and an irreversible compression scheme is referred to simply as irreversible.

Figure 3A:
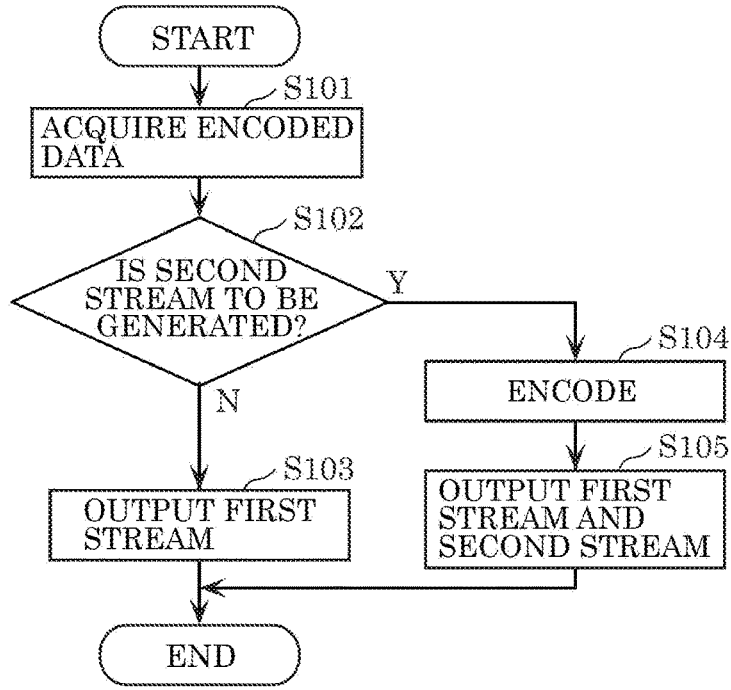
FIG. 3A is a flowchart showing an example of an operation of the transform device according to Embodiment 1.

FIG. 3A is a flowchart showing an example of an operation of transform device 10a according to this embodiment.

First, acquisition unit 11 of transform device 10a acquires the encoded data of the first stream (Step S101). Determiner 13 then determines whether or not to start generation of the second stream (Step S102). If determiner 13 determines not to start generation of the second stream of N in Step S102), output unit 14 outputs the first stream including the encoded data acquired in Step S101 to first decoding device 21 (Step S103).

On the other hand, if determiner 13 determines to start generation of the second stream (if Y in Step S102), encoder 12b reversibly encodes the decoded image of the encoded data of the first stream into encoded data of an I picture (Step S104). Output unit 14 then outputs the first stream including the encoded data acquired in Step S101 to first decoding device 21 and outputs the second stream including the encoded data obtained by the encoding in Step S104 to second decoding device 22 (Step S105).

Figure 3B:
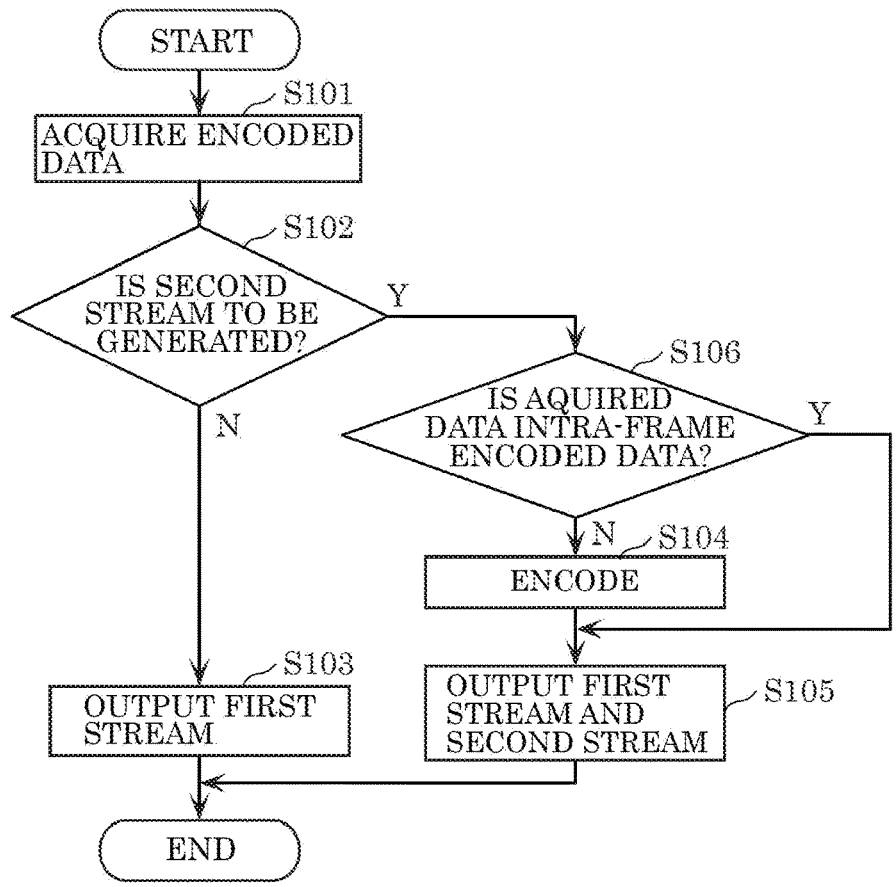
FIG. 3B is a flowchart showing another example of an operation of the transform device according to Embodiment 1.

FIG. 3B is a flowchart showing another example of the operation of transform device 10a according to this embodiment. The flowchart of FIG. 3B includes the steps of the flowchart of FIG. 3A and additionally includes Step S106.

Specifically, when determiner 13 determines to start generation of the second stream in Step S102 (if Y in Step S102), encoder 12b determines whether the encoded data acquired in Step S101 is intra-frame encoded data or not (Step S106). If it is determined that the encoded data is not intra-frame encoded data (if N in Step S106), encoder 12b reversibly encodes the decoded image of the encoded data into encoded data of an I picture (Step S104). On the other hand, if it is determined that the encoded data is intra-frame encoded data (if Y in Step S106), encoder 12b does not encode the decoded image of the encoded data. That is, the encoded data is not transcoded.

If the encoding in Step S104 is performed, output unit 14 outputs the first stream including the encoded data acquired in Step S101 and outputs the second stream including the encoded data obtained by the encoding in Step S104 (Step S105). If the re-encoding in Step S104 is not performed, output unit 14 outputs the first stream and the second stream each including the encoded data acquired in Step S101 (Step S105).

As described above, transform device 10a according to this embodiment includes acquisition unit 11 that acquires a first stream, transformer 12 that transforms an irreversibly encoded first picture included in the first stream into a second picture, which is a reversibly encoded picture, and output unit 14 that outputs a second stream including the second picture. The first picture corresponds to encoded data P2 described above, and the second picture corresponds to encoded data I2 described above. For example, transformer 12 decodes the first picture to generate a decoded image of the first picture, and reversibly encodes the decoded image of the first picture to transform the first picture into the second picture.

With this configuration, for example, when second decoding device 22 requests transmission of the first picture and the following pictures included in the first stream while the first stream is being transmitted, the second stream including the second picture, which is a reversibly encoded picture, rather than an irreversibly encoded picture, is transmitted to second decoding device 22. As a result, second decoding device 22 can appropriately decode the second picture and the following pictures included in the second stream, and can reduce the image quality degradation of the decoded image. Therefore, efficient random access can be achieved and a more flexible service can be provided without increasing the network load and causing a limitation on the number of the terminals that can reproduce the stream at the same time.

As shown in FIG. 2, transformer 12 transforms the first picture into the second picture by intra-prediction encoding of the decoded image of the first picture.

As a result, since the second picture is a reversibly encoded I picture, second decoding device 22 can decode the second stream from the top thereof without referring to the decoded image even if the second picture is arranged at the top of the second stream. In addition, by changing the encoding scheme for the first picture of the pictures included in the first stream, changing of the encoding scheme for the other pictures can be omitted.

That is, output unit 14 puts a third picture, which is a picture that is encoded by referring to the decoded image of the first picture and included in the first stream, in the second stream in such a manner that the third picture follows the second picture in the decoding order, and outputs the second stream including the third picture. The third picture is encoded data P3 shown in FIG. 2, for example, and the second stream to be transmitted to second decoding device 22 includes encoded data I2, which is the second picture, and encoded data P3, which is the third picture.

As a result, even if the encoding scheme for the third picture is not changed, second decoding device 22 that receives the second stream can appropriately decode the third picture by referring to the decoded image of the second picture.

In this embodiment, output unit 14 also outputs the first stream acquired by acquisition unit 11.

As a result, while transmitting the first stream to first decoding device 21, the second stream can be transmitted to second decoding device 22 in response to the request from second decoding device 22.

In this embodiment, transform device 10a further includes determiner 13 that determines whether or not to change the encoding scheme for each of the plurality of pictures included in the first stream, and transformer 12 transforms the first picture the encoding scheme for which is determined to be changed by determiner 13 into the second picture. Specifically, determiner 13 determines to change the encoding scheme for each of one or more consecutive pictures including the first picture, which depend on the timing of reception of the request for transmission of the stream, among the plurality of pictures included in the first stream. For example, in the example shown in FIG. 2, it is determined to change the encoding scheme for encoded data P2 according to the timing.

As a result, the encoding scheme for a picture can be changed at an appropriate timing, and reproduction of the second stream can be started by reducing the lag from the transmission request.

Determiner 13 also determines not to change the encoding scheme for each picture after the at least one or more consecutive pictures among the plurality of pictures included in the first stream. For example, in the example shown in FIG. 2, it is determined not to change the encoding schemes for encoded data P4 and encoded data P5.

As a result, the load of the change of the encoding scheme can be reduced.

Although the inter-frame encoded data is a P picture encoded by referring to the preceding encoded data in this embodiment, the present invention is not limited to this implementation. The inter-frame encoded data may be data encoded by referring to encoded data that is not the preceding encoded data, or data encoded by referring to more than one piece of encoded data. For example, the encoded data to be encoded or transcoded is not limited to a P picture but may be a B picture.

Although transform device 10a according to this embodiment includes determiner 13, transform device 10a need not include determiner 13. In that case, determiner 13 is provided in an external device, such as a personal computer, and determiner 13 of the external device may output a direction signal to encoder 12b and output unit 14.

In this embodiment, when it is determined to start generation of the second stream, one piece of encoded data that depends on the timing of the determination is transcoded. However, transform device 10a may transcode a portion of the first stream from that encoded data to the encoded data of the next I picture.

Although decoder 12a of transformer 12 decodes all the encoded data included in the first stream in this embodiment, decoder 12a may decode part of the encoded data. For example, decoder 12a may decode only a predetermined number of pictures (that is, encoded data) following an I picture, or may decode only encoded data that satisfies a predetermined condition or encoded data in a period that satisfies a predetermined condition. In that case, the power consumption of transform device 10a can be reduced.

Although a process of transforming encoded data of a frame included in a first stream into encoded data included in a second stream is referred to as transcoding in the present disclosure, the name of the process is not limited to transcoding. For example, the process may be referred to simply as encoding. In other words, the transform device may be referred to also as an encoding device.

Embodiment 2

Transform device 10a according to Embodiment 2 has the configuration shown in FIG. 1, and outputs a first stream including first encoded data obtained by encoding a first frame, and a second stream. The second stream in this embodiment includes second encoded data, which is intra-frame encoded data obtained by transcoding the first encoded data in an irreversible compression scheme, and fourth encoded data, which is obtained by transcoding third encoded data in a reversible compression scheme. The third encoded data is encoded data following the first encoded data included in the first stream, and is encoded data of a frame encoded by referring to a decoded image of the first encoded data.

For example, if the first encoded data is transcoded into intra-frame encoded data in a reversible compression scheme, the intra-frame encoded data can have a large code amount, which can lead to a high communication load. In this embodiment, the first encoded data is transcoded into intra-frame encoded data in an irreversible compression scheme, rather than in a reversible compression scheme, and therefore, the code amount of the second stream can be reduced.

Figure 4:
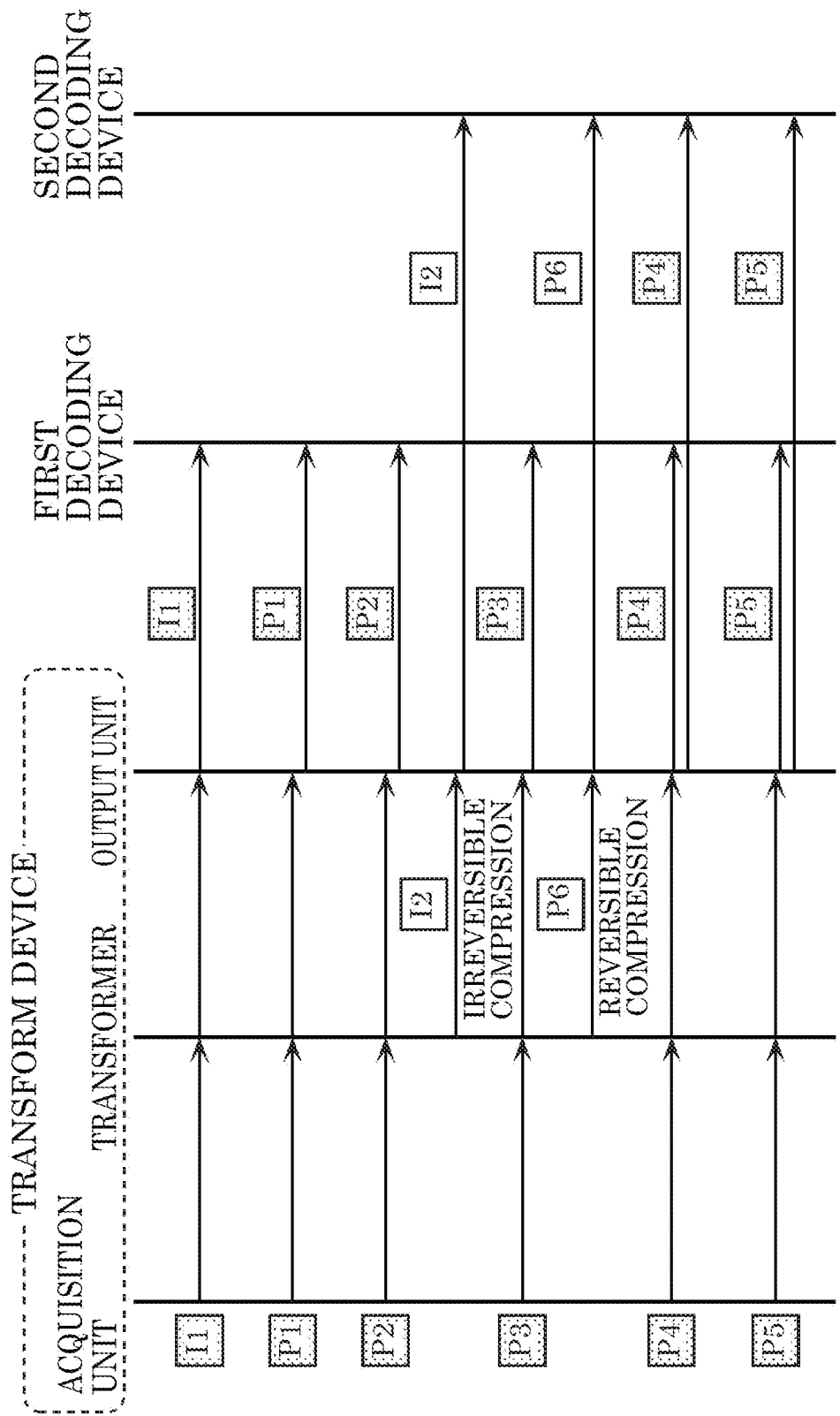
FIG. 4 is a sequence diagram showing an example of a process performed by each component of the transform device according to Embodiment 2.

FIG. 4 is a sequence diagram showing an example of a process performed by each component of transform device 10a according to this embodiment.

As shown in FIG. 4, acquisition unit 11 of transform device 10a acquires encoded data IL encoded data P1, encoded data P2, encoded data P3, and encoded data P4 in the order listed above. That is, acquisition unit 11 acquires the first stream including these pieces of encoded data arranged in the order listed above. The P picture is encoded by referring to the preceding encoded data. In the example shown in FIG. 4, first decoding device 21 decodes all the encoded data included in the first stream, and second decoding device 22 requests transform device 10a to transmit encoded data P2 and the following encoded data included in the first stream.

As shown in FIG. 4, each time acquisition unit 11 acquires encoded data, acquisition unit 11 outputs the encoded data to output unit 14 and transformer 12. Decoder 12a of transformer 12 decodes the encoded data output from acquisition unit 11 to generate a decoded image corresponding to the encoded data.

Determiner 13 determines not to transcode the encoded data sequentially input to transformer 12 before the request from second decoding device 22 is received, for example. Output unit 14 transmits the first stream to first decoding device 21 but does not transmit the second stream to second decoding device 22 until the request from second decoding device 22 is received, for example.

That is, as described above, when second decoding device 22 requests for transmission of encoded data P2 and the following encoded data included in the first stream, determiner 13 determines not to transcode encoded data I1 and encoded data P1. In other words, determiner 13 determines not to start generation of the second stream. And output unit 14 transmits encoded data I1 and encoded data P1 to first decoding device 21 as encoded data included in the first stream.

When the request from second decoding device 22 is received, determiner 13 determines to transcode encoded data P2 included in the first stream. In other words, determiner 13 determines to start generation of the second stream. Determiner 13 then transmits a direction signal for re-encoding of encoded data P2 to encoder 12b.

In response to the direction signal, encoder 12b encodes the decoded image corresponding to encoded data P2 generated by decoder 12a. In this encoding, an intra prediction and an irreversible compression scheme are used. Encoder 12b outputs encoded data I2, which is intra-frame encoded data obtained by the encoding, to output unit 14. In this way, transformer 12 transforms encoded data P2 into encoded data I2 of an I picture, which is encoded in the irreversible compression scheme. In other words, a P picture is transformed into an irreversible I picture.

Output unit 14 outputs encoded data P2 to first decoding device 21 as encoded data included in the first stream, and outputs encoded data I2 to second decoding device 22 as encoded data included in the second stream.

When encoded data P3 following encoded data P2 is input to transformer 12, determiner 13 determines to transcode encoded data P3 included in the first stream. Determiner 13 then transmits a direction signal for re-encoding of encoded data P3 to encoder 12b.

In response to the direction signal, encoder 12b encodes the decoded image of encoded data P3 generated by decoder 12a. Specifically, encoder 12b encodes the decoded image of encoded data P3 in a reversible compression scheme by referring to the decoded image of encoded data I2. Encoder 12b then outputs encoded data P6, which is inter-frame encoded data obtained by the encoding, to output unit 14. In this way, transformer 12 transforms encoded data P3 into encoded data P6, which is a P picture encoded in the reversible compression scheme. In other words, an irreversible P picture is transformed into a reversible P picture.

Output unit 14 outputs encoded data P3 to first decoding device 21 as encoded data included in the first stream, and outputs encoded data P6 to second decoding device 22 as encoded data included in the second stream.

After that, when encoded data P4 and the following encoded data are input to transformer 12, determiner 13 determines not to transcode the encoded data.

Following the output of encoded data P3, output unit 14 also outputs encoded data P4 and the following encoded data to first decoding device 21 as encoded data included in the first stream. In this way, the first stream is output from output unit 14 to first decoding device 21.

According to the result of the determination by determiner 13 described above, output unit 14 further outputs encoded data P4 and the following encoded data to second decoding device 22 as encoded data included in the second stream without changing the encoding scheme for the encoded data. In this way, the second stream including encoded data I2 and P6 as well as encoded data P4 and the following encoded data of the first stream is generated by output unit 14 and output to second decoding device 22. The second stream does not include encoded data I1 and P1 of the first stream.

With this configuration, second decoding device 22 can substantially start decoding of the first stream from encoded data P2 by decoding the second stream. In addition, the code amount of the second stream can be further reduced compared with Embodiment 1.

In short, according to this embodiment, transformer 12 decodes the fourth picture included in the first stream, which is a picture irreversibly inter-prediction encoded, to generate a decoded image of the fourth picture. Transformer 12 then transforms the fourth picture into a fifth picture by irreversibly intra-prediction encoding the decoded image of the fourth picture. In the transformation of the first picture into the second picture, transformer 12 transforms the first picture into the second picture by reversibly inter-prediction encoding the decoded image of the first picture by referring to the decoded image of the fifth picture, the first picture being inter-prediction encoded by referring to the decoded image of the fourth picture. Output unit 14 outputs the second stream including the fifth picture and the second picture. For example, the fourth picture and the fifth picture correspond to encoded data P2 and encoded data I2 shown in FIG. 4, respectively, and the first picture and the second picture correspond to encoded data P3 and encoded data P6 shown in FIG. 4, respectively.

In this way, the fourth picture and the first picture included in the first stream are transformed into the fifth picture and the second picture included in the second stream. In other words, encoded data P2, which is irreversibly encoded, and encoded data P3, which is irreversibly encoded, are transformed into encoded data I2, which is irreversibly encoded, and encoded data P6, which is reversibly encoded, respectively.

For example, an I picture reversibly encoded has a large code amount, and transmitting the I picture can lead to an increase of the network load. However, according to this embodiment, encoded data P6 is not formed as a reversibly encoded I picture but as a reversibly encoded P picture. In addition, since encoded data P2 irreversibly encoded is transformed into encoded data I2, which is an irreversibly encoded I picture, the overall bit rate of the stream can be reduced, although the code amount of each picture may increase.

Although the decoded image of encoded data P3 is encoded in a reversible compression scheme to generate reversible encoded data P6 in this embodiment, the decoded image of encoded data P3 may be encoded in an irreversible compression scheme. In that case, not only encoded data P2 and P3 but also encoded data P4 is transcoded. That is, transformer 12 encodes the decoded image of encoded data P4 in a reversible compression scheme. The timings of the encodings in the reversible compression scheme may be controlled by increasing the number of encodings in the irreversible compression scheme.

Although encoded data P6 immediately following encoded data I2 is generated in the reversible compression scheme in this embodiment, the encoded data generated by reversible compression need not be the encoded data immediately following encoded data I2 but can be any encoded data following encoded data I2. Transform device 10a may transcode each piece of encoded data from the encoded data that depends on the timing of start of generation of the second stream to the encoded data of the next I picture.

That is, determiner 13 may determine to change the encoding scheme for each of one or more consecutive pictures including the first picture, which depend on the timing of reception of the request for transmission of the stream, among the plurality of pictures included in the first stream. In that case, encoding scheme for a picture can be changed at an appropriate timing, and reproduction of the second stream can be started by reducing the lag from the transmission request.

Embodiment 3

Transform device 10a according to Embodiment 3 has the configuration shown in FIG. 1, and outputs a first stream including first encoded data obtained by encoding a first frame, and a second stream. The second stream in this embodiment includes second encoded data, which is intra-frame encoded data obtained by transcoding the first encoded data in an irreversible compression scheme, and fourth encoded data, which is obtained by transcoding the first encoded data in a reversible compression scheme.

For example, if the first encoded data is transcoded into intra-frame encoded data in a reversible compression scheme, the intra-frame encoded data can have a large code amount, which can lead to a high communication load. In this embodiment, the first encoded data is transcoded not only in a reversible compression scheme but also in an irreversible compression scheme, and therefore, the code amount of the second stream can be reduced. In short, although different pieces of encoded data are transcoded in Embodiment 2, the same first encoded data is transcoded into the second encoded data and the fourth encoded data in this embodiment. The fourth encoded data is transcoded by referring to the second encoded data. Therefore, the amount of the difference between the image of the fourth encoded data and the image of the second encoded data to be referred to can be reduced. As a result, the code amount of the second stream can be reduced.

Figure 5:
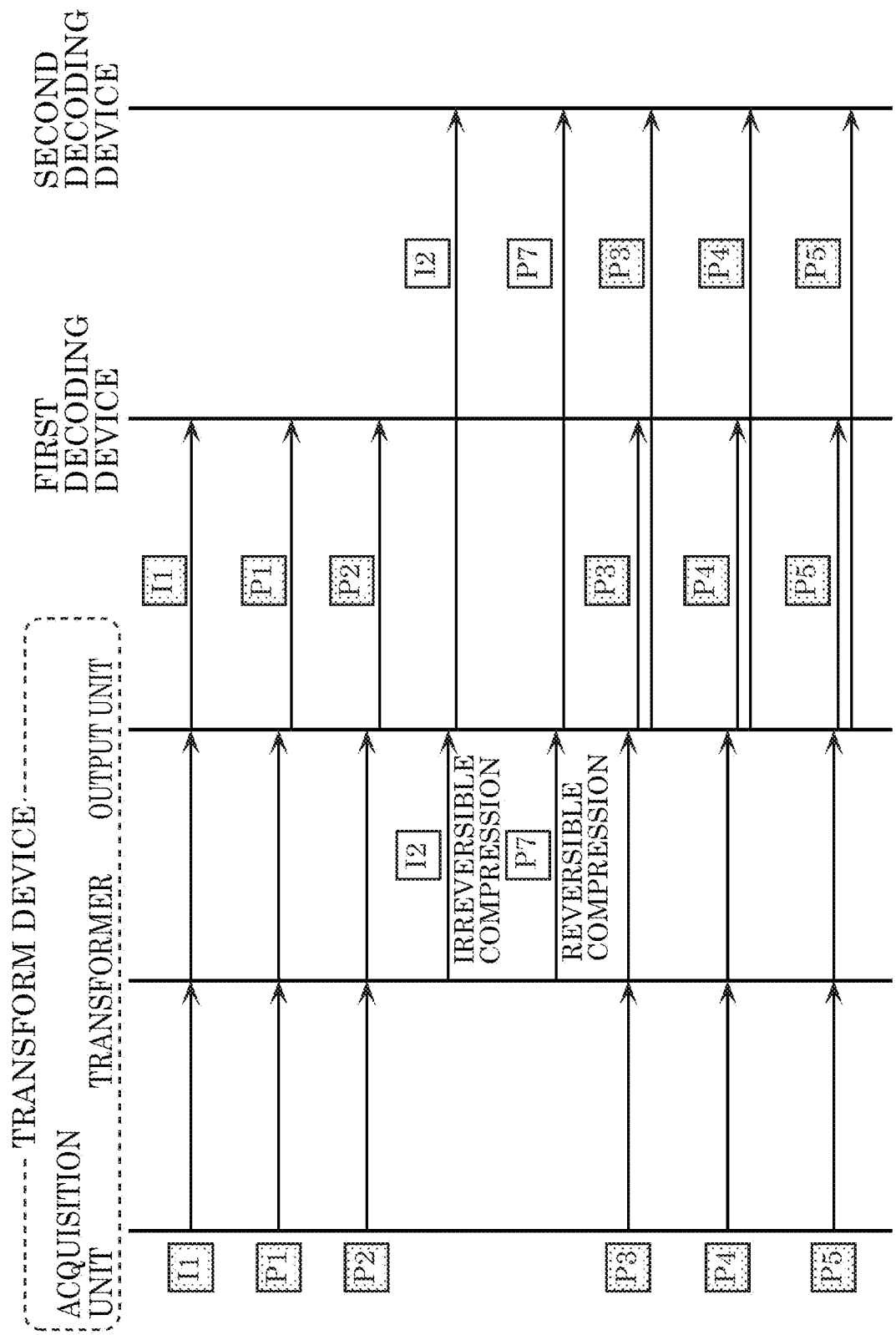
FIG. 5 is a sequence diagram showing an example of a process performed by each component of the transform device according to Embodiment 3.

FIG. 5 is a sequence diagram showing an example of a process performed by each component of transform device 10a according to this embodiment.

As shown in FIG. 5, acquisition unit 11 of transform device 10a acquires encoded data IL encoded data P1, encoded data P2, encoded data P3, and encoded data P4 in the order listed above. That is, acquisition unit 11 acquires the first stream including these pieces of encoded data arranged in the order listed above. The P picture is encoded by referring to the preceding encoded data. In the example shown in FIG. 5, first decoding device 21 decodes all the encoded data included in the first stream, and second decoding device 22 requests transform device 10a to transmit encoded data P2 and the following encoded data included in the first stream.

As shown in FIG. 5, each time acquisition unit 11 acquires encoded data, acquisition unit 11 outputs the encoded data to output unit 14 and transformer 12. Decoder 12a of transformer 12 decodes the encoded data output from acquisition unit 11 to generate a decoded image corresponding to the encoded data.

Determiner 13 determines not to transcode the encoded data sequentially input to transformer 12 before the request from second decoding device 22 is received, for example. Output unit 14 transmits the first stream to first decoding device 21 but does not transmit the second stream to second decoding device 22 until the request from second decoding device 22 is received, for example.

That is, as described above, when second decoding device 22 requests for transmission of encoded data P2 and the following encoded data included in the first stream, determiner 13 determines not to transcode encoded data I1 and encoded data P1. In other words, determiner 13 determines not to start generation of the second stream. And output unit 14 transmits encoded data I1 and encoded data P1 to first decoding device 21 as encoded data included in the first stream.

When the request from second decoding device 22 is received, determiner 13 determines to transcode encoded data P2 included in the first stream. In other words, determiner 13 determines to start generation of the second stream. Determiner 13 then transmits a direction signal for re-encoding of encoded data P2 to encoder 12b.

In response to the direction signal, encoder 12b encodes the decoded image corresponding to encoded data P2 generated by decoder 12a. In this encoding, an intra prediction and an irreversible compression scheme are used. Encoder 12b outputs encoded data I2, which is intra-frame encoded data obtained by the encoding, to output unit 14. In this way, transformer 12 transforms encoded data P2 into encoded data I2, which is an I picture encoded in the irreversible compression scheme. In other words, a P picture is transformed into an irreversible I picture.

Output unit 14 outputs encoded data P2 to first decoding device 21 as encoded data included in the first stream, and outputs encoded data I2 to second decoding device 22 as encoded data included in the second stream.

In this embodiment, decoder 12a decodes encoded data I2 to generate a decoded image corresponding to encoded data I2. Encoder 12b encodes the decoded image of encoded data P2 in the reversible compression scheme by referring to the decoded image of encoded data I2. Encoder 12b then outputs encoded data P7, which is inter-frame encoded data obtained by the encoding, to output unit 14.

Output unit 14 outputs encoded data P7 to second decoding device 22 as encoded data included in the second stream.

After that, when encoded data P3 and the following encoded data are input to transformer 12, determiner 13 determines not to transcode the encoded data.

Following the output of encoded data P2, output unit 14 also outputs encoded data P3 and the following encoded data to first decoding device 21 as encoded data included in the first stream. In this way, the first stream is output from output unit 14 to first decoding device 21.

Output unit 14 further outputs encoded data P3 and the following encoded data to second decoding device 22 as encoded data included in the second stream. In this way, the second stream including encoded data I2 and P7 as well as encoded data P3 and the following encoded data of the first stream is generated by output unit 14 and output to second decoding device 22. The second stream does not include encoded data I1 and P1 of the first stream.

With this configuration, second decoding device 22 can substantially start decoding of the first stream from encoded data P2 by decoding the second stream. In addition, the code amount of the second stream can be further reduced compared with Embodiment 1. In addition, although different pieces of encoded data are transcoded in Embodiment 2, the same encoded data P2 is transcoded into encoded data I2 and encoded data P7 in this embodiment. Encoded data P2 is transcoded into encoded data P7 by referring to encoded data I2. Therefore, the amount of the difference between the image of encoded data P7 and the image of encoded data I2 to be referred to can be reduced. As a result, the code amount of the second stream can be reduced.

In short, according to this embodiment, transformer 12 decodes the first picture included in the first stream, which is irreversibly inter-prediction encoded, to generate a decoded image of the first picture. Transformer 12 then transforms the first picture into a fourth picture by irreversibly intra-prediction encoding the decoded image of the first picture. In the transformation of the first picture into the second picture, transformer 12 transforms the first picture into the second picture by reversibly inter-prediction encoding the decoded image of the first picture by referring to the decoded image of the fourth picture. Output unit 14 outputs the second stream including the fourth picture and the second picture. For example, the fourth picture corresponds to encoded data I2 shown in FIG. 5, and the first picture and the second picture correspond to encoded data P2 and encoded data P7 shown in FIG. 5, respectively.

In this way, the first picture included in the first stream is transformed into the fourth picture and the second picture included in the second stream. In other words, encoded data P2, which is irreversibly encoded, is transformed into encoded data I2, which is irreversibly encoded, and encoded data P7, which is reversibly encoded.

For example, an I picture reversibly encoded has a large code amount, and transmitting the I picture can lead to an increase of the network load. However, according to this embodiment, encoded data P7 is not formed as a reversibly encoded I picture but as a reversibly encoded P picture. In addition, since encoded data I2 and encoded data P7 are generated by transformation of the same encoded data P2, the image of encoded data I2 and the image of encoded data P7 are similar to each other. As a result, the decoded image of encoded data I2 is referred to when transforming encoded data P2 into encoded data P7, and therefore, the code amount of encoded data P7 can be reduced. As a result, the overall bit rate of the stream can be reduced.

Transform device 10a according to this embodiment may continue transcoding the pieces of encoded data from the encoded data that depends on the timing of start of generation of the second stream to the encoded data of the next I picture.

Embodiment 4

An encoding device according to Embodiment 4 includes an encoder that encodes a moving image to generate a first stream and a transformer that generates a second stream from the first stream.

Figure 6:
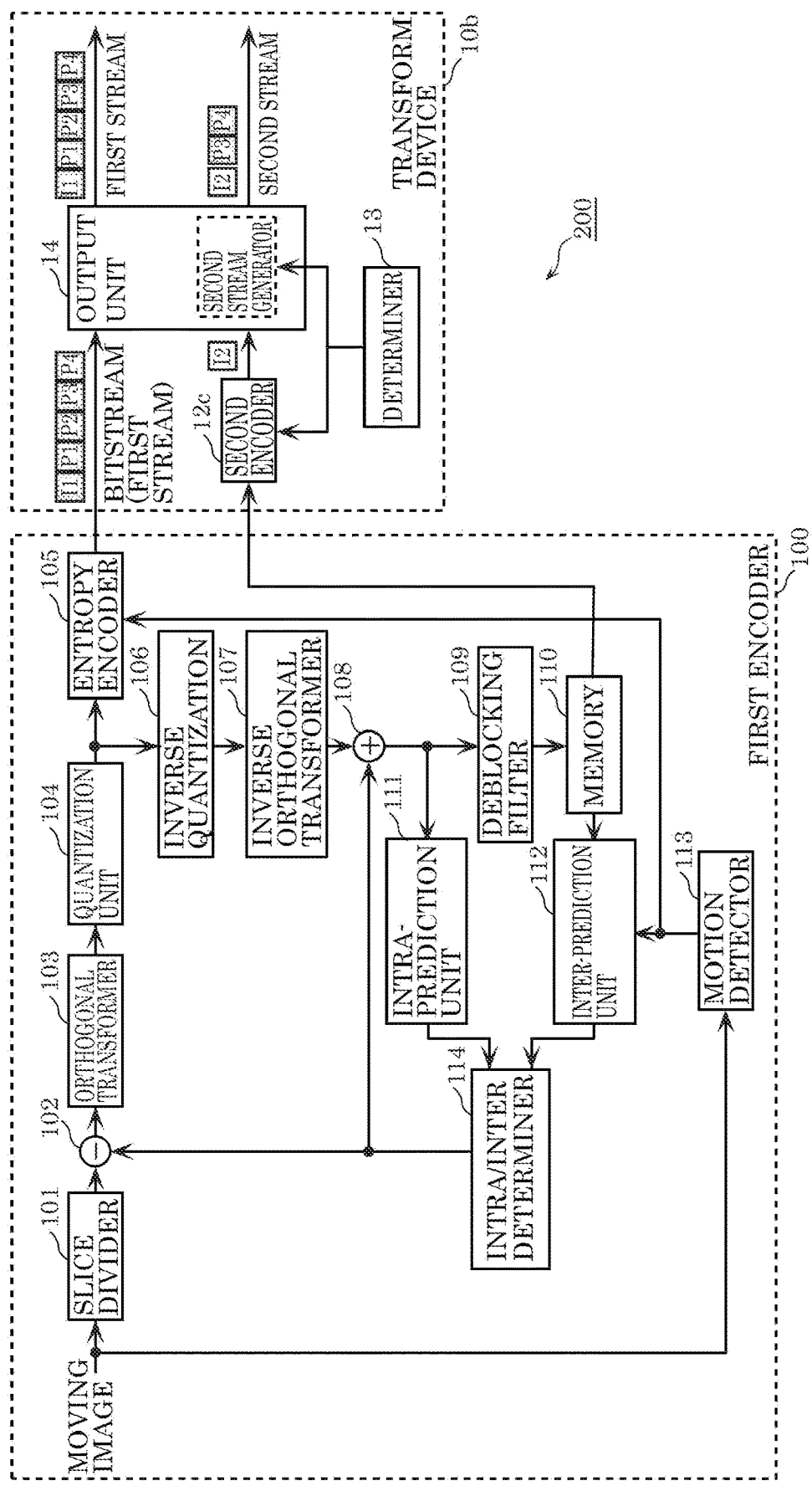
FIG. 6 is a diagram showing a configuration of an encoding device according to Embodiment 4.

FIG. 6 is a block diagram showing a configuration of the encoding device according to this embodiment. In FIG. 6, the same components as those in FIG. 1 showing Embodiment 1 are denoted by the same reference numerals, and detailed descriptions thereof will be omitted.

As shown in FIG. 6, encoding device 200 includes first encoder 100 and transform device 10b.

First encoder 100 includes slice divider 101, subtractor 102, orthogonal transformer 103, quantization unit 104, entropy encoder 105, inverse quantization unit 106, inverse orthogonal transformer 107, adder 108, deblocking filter 109, memory 110, intra-prediction unit 111, inter-prediction unit 112, motion detector 113, and intra/inter determiner 114.

Slice divider 101 acquires a moving image signal including a plurality of pictures, and divides each picture into a plurality of slices or slice segments.

Subtractor 102 acquires the moving image signal including a plurality of pictures, and acquires a prediction image from intra/inter determiner 114. Subtractor 102 then generates a differential image by subtracting the prediction image from a block to be encoded (referred to as a target block hereinafter) of the pictures included in the moving image signal. The block corresponds to a coding tree unit (CTU), a coding unit (CU), a prediction unit (PU), or a transform unit (TU).

Orthogonal transformer 103 performs an orthogonal transformation (frequency transformation), such as a discrete cosine transform, on the differential image generated by subtractor 102, thereby transforming the differential image into a coefficient string formed by a plurality of frequency coefficients. Quantization unit 104 quantizes each frequency coefficient included in the coefficient string to generate a quantized coefficient string.

Inverse quantization unit 106 inverse-quantizes the coefficient string quantized by quantization unit 104. Inverse orthogonal transformer 107 performs an inverse orthogonal transformation (inverse frequency transformation), such as an inverse discrete cosine transform, on each frequency coefficient included in the inverse-quantized coefficient string to generate a decoded differential image.

Adder 108 acquires the prediction image from intra/inter determiner 114, and sums the prediction image and the decoded differential image generated by inverse orthogonal transformer 107 to generate a local decoded image (reconstructed image).

Deblocking filter 109 removes a block noise from local decoded image generated by adder 108, and stores the local decoded image in memory 110.

Memory 110 is a memory for storing the local decoded image as a reference image for inter-prediction. Memory 110 is used as a decoded picture buffer (DPB).

Intra-prediction unit 111 performs an intra prediction on the target block using the local decoded image generated by adder 108, thereby generating a prediction image (intra-prediction image).

Motion detector 113 detects a motion vector for the target block included in the moving image signal, and outputs the detected motion vector to inter-prediction unit 112 and entropy encoder 105.

Inter-prediction unit 112 performs a motion compensation on the target block by referring to an image stored in memory 110 as a reference image and using the motion vector detected by motion detector 113. Inter-prediction unit 112 generates a prediction image (inter-prediction image) of the target block by performing such a motion compensation, that is, by performing an inter-prediction on the target block.

Intra/inter determiner 114 determines whether to intra-prediction encode or inter-prediction encode the target block. When intra-prediction encoding the target block, intra/inter determiner 114 outputs the prediction image (intra-prediction image) generated by intra-prediction unit 111 to subtractor 102 and adder 108. On the other hand, when inter-prediction encoding the target block, intra/inter determiner 114 outputs the prediction image (inter-prediction image) generated by inter-prediction unit 112 to subtractor 102 and adder 108.

Entropy encoder 105 generates a bitstream by entropy-encoding (variable-length encoding) the coefficient string quantized by quantization unit 104 and the motion vector detected by motion detector 113. In other words, entropy encoder 105 acquires a first stream, which is a bitstream, by entropy encoding, and outputs the first stream to transform device 10b. In other words, entropy encoder 105 functions as acquisition unit 11 of transform device 10a according to Embodiments 1 to 3.

Transform device 10b has the same function as transform device 10a according to Embodiments 1 to 3. Specifically, transform device 10b includes second encoder 12c, determiner 13, and output unit 14. Second encoder 12c has the same function as encoder 12b of transform device 10a according to Embodiments 1 to 3. Transform device 10b does not have decoder 12a. However, transform device 10b acquires each image stored in memory 110 of first encoder 100 as a decoded image of each piece of encoded data included in the first stream. That is, second encoder 12c performs an encoding process on the decoded images stored in memory 110 of first encoder 100. Therefore, the configuration of transform device 10b can be simplified.

Second encoder 12c may have the same configuration as first encoder 100. In that case, quantization unit 104 in second encoder 12c outputs each frequency coefficient included in the coefficient string described above to entropy encoder 105 without quantizing the frequency coefficient. In this way, second encoder 12c can achieve a reversible encoding of an image. Alternatively, quantization unit 104 in second encoder 12c may perform a quantization with a quantization width of 1 on each frequency coefficient included in the coefficient string described above. In this way, second encoder 12c can achieve a reversible encoding of an image, as with the case described above. Encoder 12b in transform device 10a according to Embodiments 1 to 3 can also have the same configuration as first encoder 100, as with second encoder 12c. In that case, again, encoder 12b may achieve a reversible encoding of an image by omitting the quantization process or by performing a quantization with a quantization width of 1.

Embodiment 5

A video distribution system according to Embodiment 5 includes a video distribution device including a transform device.

Figure 7:
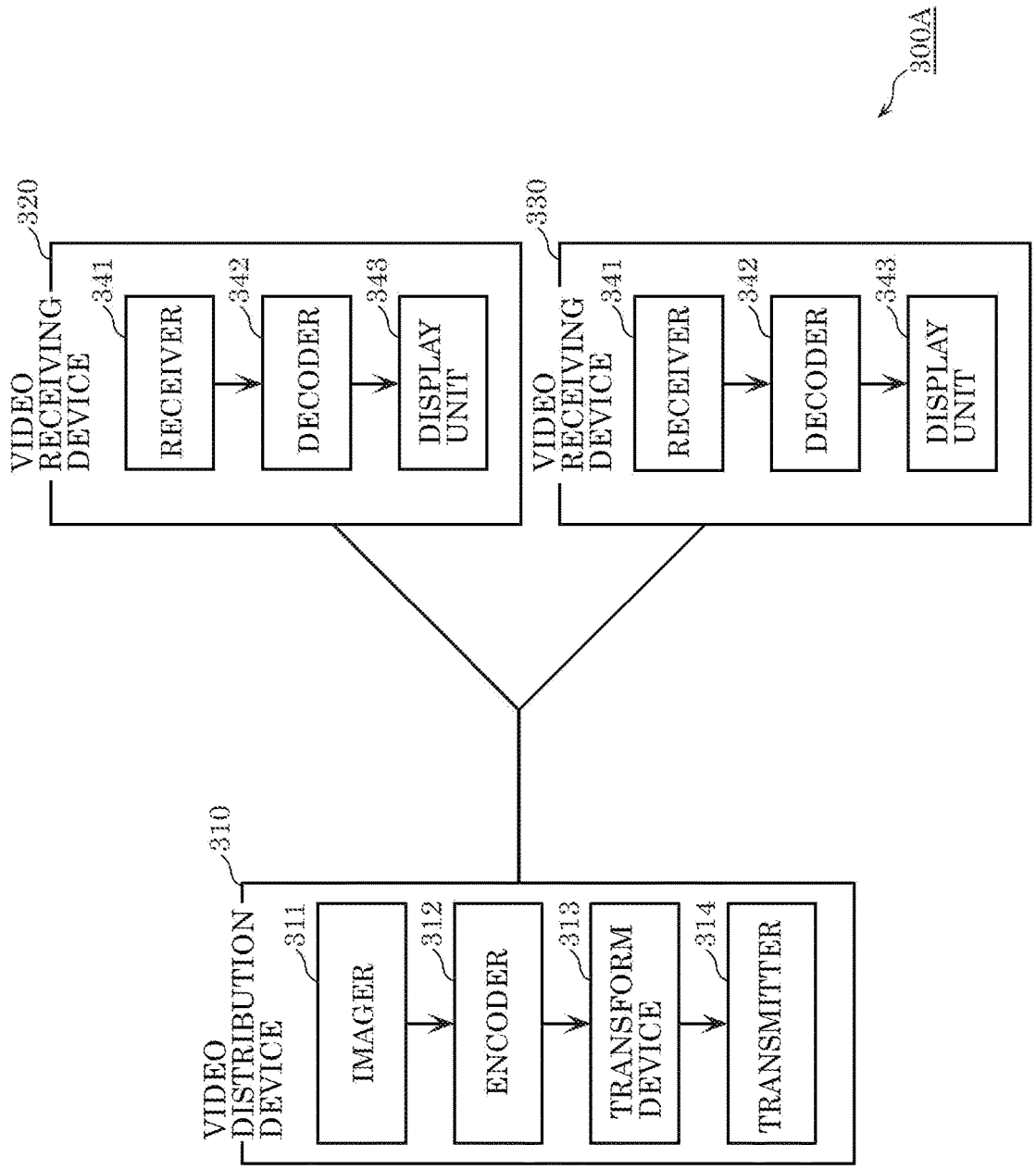
FIG. 7 is a diagram showing a configuration of a video distribution system according to Embodiment 5.

FIG. 7 is a diagram showing a configuration of the video distribution system according to this embodiment.

As shown in FIG. 7, video distribution system 300A includes video distribution device 310 that includes a transform device, and video receiving devices 320 and 330.

Video distribution device 310 includes imager 311, encoder 312, transform device 313, and transmitter 314. Such video distribution device 310 is connected to video receiving devices 320 and 330 over a network, and transmits a stream of video data to video receiving devices 320 and 330.

Imager 311 includes an optical system including a plurality of lenses, and a photoelectric conversion element serving as an imaging element. Imager 311 converts an optical image of a subject into a pixel-based signal. The pixel-based signal is input to encoder 312 as a video signal.

Encoder 312 encodes the video signal input from imager 311 to generate encoded data, and outputs the encoded data to transform device 313.

Transform device 313 is transform device 10a according to Embodiments 1 to 3. First decoding device 21 according to Embodiments 1 to 3 corresponds to video receiving device 320, and second decoding device 22 corresponds to video receiving device 330. When the destination of the video data transmitted from video distribution device 310 is only video receiving device 320, transform device 313 outputs only the first stream to transmitter 314. While transmitting the video data to video receiving device 320, for example, video distribution device 310 may receive, from video receiving device 330, a request for starting the distribution of the video data to video receiving device 330. In that case, transform device 313 outputs the second stream along with the first stream to transmitter 314 in the same manner as that in Embodiments 1 to 3.

The unit including encoder 312 and transform device 313 may be encoding device 200 according to Embodiment 4.

Transmitter 314 transmits the stream output from transform device 313 to at least one of video receiving devices 320 and 330. In this embodiment, transmitter 314 transmits the first stream to video receiving device 320, and transmits the second stream to video receiving device 330. If video distribution device 310 is connected to each of video receiving devices 320 and 330 over a network, transmitter 314 may convert the stream into a plurality of IP packets, and transmit the packets.

Each of video receiving devices 320 and 330 includes receiver 341, decoder 342, and display unit 343. Receiver 341 receives a stream from video distribution device 310, and outputs the stream to decoder 342. When receiver 341 receives a plurality of IP packets, receiver 341 converts the plurality of IP packets into a stream, and outputs the stream to decoder 342. Decoder 342 decodes the stream to generate a video signal, and outputs the video signal to display unit 343. Display unit 343 displays a video according to the video signal generated by decoder 342.

With this configuration, even while transmitting a stream to video receiving device 320, video distribution device 310 can transmit a stream starting with encoded data at any timing to video receiving device 330 without waiting for the next intra-frame encoded data. Here, for example, in order that transmission of a stream to each of a plurality of video receiving devices can be started at any timing, it is possible to provide the video distribution device with a plurality of units including an encoder and a transform device. According to this embodiment, however, transform device 313 has the function of transform device 10a according to Embodiments 1 to 3, and the unit including encoder 312 and transform device 313 has the function of encoding device 200 according to Embodiment 4. Therefore, even if video distribution device 310 does not include a plurality of units including encoder 312 and transform device 313, video distribution device 310 can start transmission of a stream to each of a plurality of video receiving devices at any timing.

In addition, video receiving devices 320 and 330 according to this embodiment correspond to first decoding device 21 and second decoding device 22 according to Embodiments 1 to 3, respectively. In addition, each of video receiving devices 320 and 330 includes receiver 341 that receives a second stream including a second picture, decoder 342 that decodes the second stream to generate a video signal, and display unit 343 that displays a video according to the video signal. Here, the second picture is a reversibly encoded picture obtained by transforming an irreversibly encoded first picture included in the first stream.

As a result, when transmission of the first picture and the following pictures included in the first stream is requested while the first stream is being transmitted, receiver 341 receives the second stream including the second picture, which is a reversibly encoded picture, rather than an irreversibly encoded picture. As a result, decoder 342 can appropriately decode the second picture and the following pictures included in the second stream, and the image quality degradation of the decoded image can be reduced.

Embodiment 6

A video distribution system according to Embodiment 6 includes a video relay device including a transform device.

Figure 8:
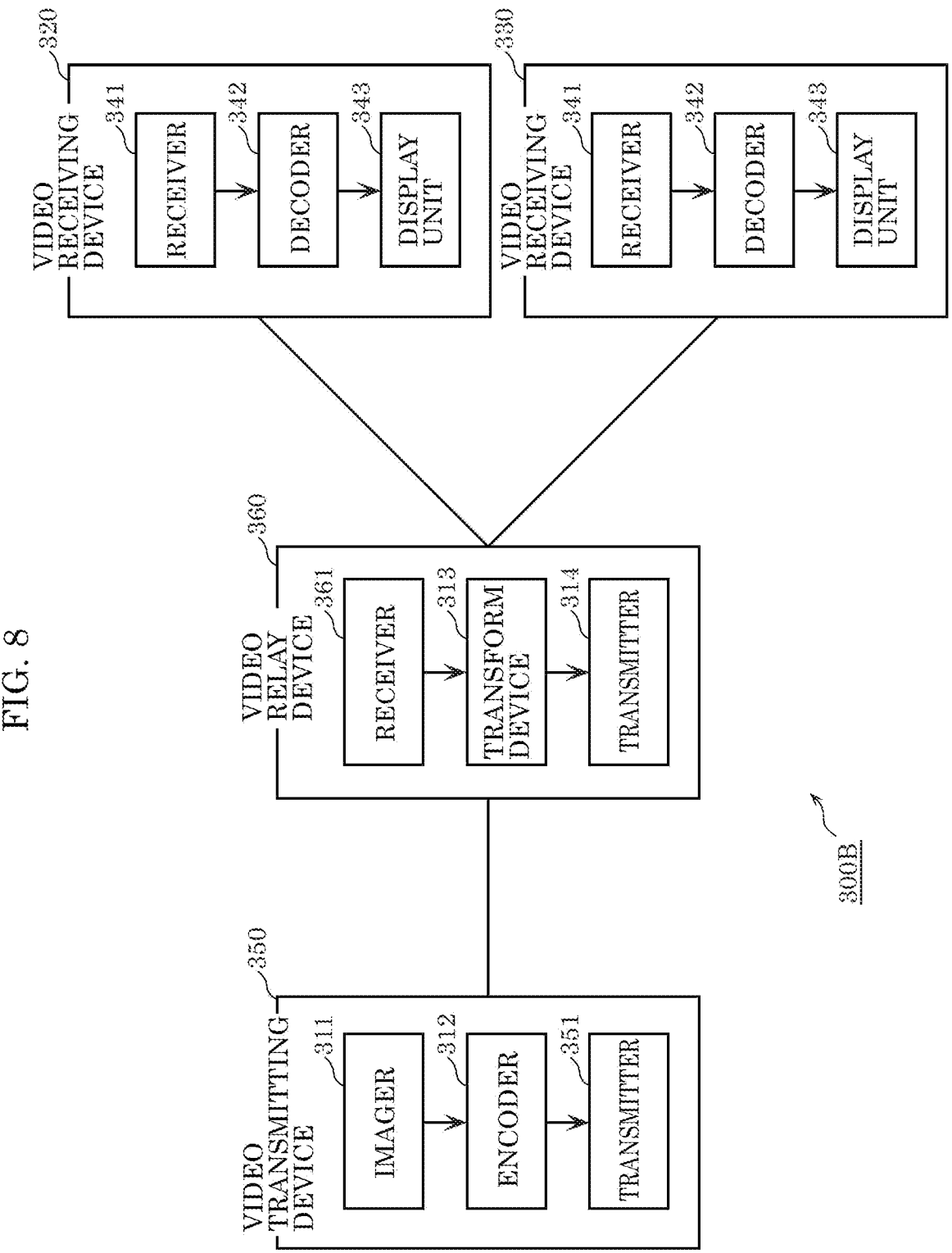
FIG. 8 is a diagram showing a configuration of a video distribution system according to Embodiment 6.

FIG. 8 is a diagram showing a configuration of the video distribution system according to this embodiment. In FIG. 8, the same components as those in FIG. 7 showing Embodiment 5 are denoted by the same reference numerals, and detailed descriptions thereof will be omitted.

As shown in FIG. 8, video distribution system 300B includes video transmitting device 350, video relay device 360, and video receiving devices 320 and 330.

Video transmitting device 350 includes imager 311, encoder 312, and transmitter 351.

Imager 311 includes an optical system including a plurality of lenses, and a photoelectric conversion element serving as an imaging element.

Imager 311 converts an optical image of a subject into a pixel-based signal. The pixel-based signal is input to encoder 312 as a video signal.

Encoder 312 encodes the video signal input from imager 311 to generate encoded data, and outputs the encoded data to transform device 313.

Transmitter 351 transmits a stream including the encoded data output from encoder 312 to video relay device 360.

Video relay device 360 is connected to video transmitting device 350 over a network, and receives the stream from video transmitting device 350. In addition, video relay device 360 is connected to each of video receiving devices 320 and 330 over the network, and transmits the stream of video data to each of video receiving devices 320 and 330.

Video relay device 360 includes receiver 361, transform device 313, and transmitter 314.

Receiver 361 receives the stream from video transmitting device 350.

Transform device 313 is transform device 10a according to Embodiments 1 to 3. First decoding device 21 according to Embodiments 1 to 3 corresponds to video receiving device 320, and second decoding device 22 corresponds to video receiving device 330. When the destination of the video data transmitted from video distribution device 310 is only video receiving device 320, transform device 313 outputs only the first stream to transmitter 314. While transmitting the video data to video receiving device 320, for example, video relay device 360 may receive, from video receiving device 330, a request for starting the distribution of the video data to video receiving device 330. In that case, transform device 313 outputs the second stream along with the first stream to transmitter 314 in the same manner as that in Embodiments 1 to 3.

Transmitter 314 transmits the stream output from transform device 313 to at least one of video receiving devices 320 and 330. In this embodiment, transmitter 314 transmits the first stream to video receiving device 320, and transmits the second stream to video receiving device 330. If video relay device 360 is connected to each of video receiving devices 320 and 330 over a network, transmitter 314 may convert the stream into a plurality of IP packets, and transmit the packets.

Each of video receiving devices 320 and 330 receives and decodes a stream from video relay device 360 to generate a video signal, and displays a video according to the video signal.

Embodiment 7

A video reproduction system according to Embodiment 7 includes a video recording/reproduction device including a transform device.

Figure 9:
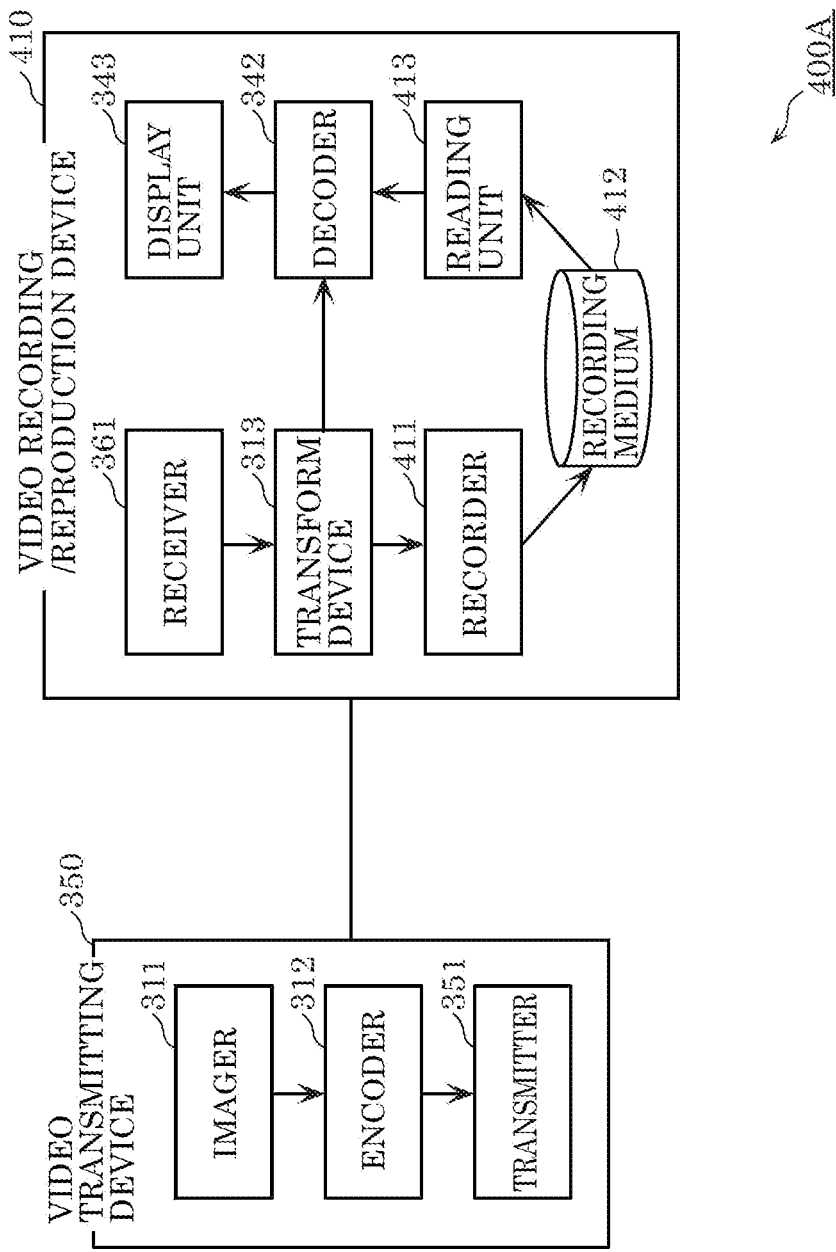
FIG. 9 is a diagram showing a configuration of a video reproduction system according to Embodiment 7.

FIG. 9 is a diagram showing a configuration of a video reproduction system according to this embodiment. In FIG. 9, the same components as those in FIG. 7 showing Embodiment 5 or FIG. 8 showing Embodiment 6 are denoted by the same reference numerals, and detailed descriptions thereof will be omitted.

As shown in FIG. 9, video reproduction system 400A includes video transmitting device 350, and video recording/reproduction device 410.

Video transmitting device 350 has the same configuration as video transmitting device 350 according to Embodiment 6, and is connected to video recording/reproduction device 410 over a network.

Video recording/reproduction device 410 includes receiver 361, transform device 313, recorder 411, recording medium 412, reading unit 413, decoder 342, and display unit 343. Such a video recording/reproduction device 410 has a real-time reproduction function (so-called streaming function) of immediately reproducing a stream while receiving the stream from video transmitting device 350 over a network, a recording function of recording a stream in recording medium 412, and a recording/reproduction function of reproducing a recorded stream.

Receiver 361 sequentially acquires IP packets from transmitter 351 of video transmitting device 350, generates a stream including encoded data from the IP packets, and outputs the stream to transform device 313.

Transform device 313 is transform device 10a according to Embodiments 1 to 3.

When performing a process for the real-time reproduction function, transform device 313 does not transform the stream output from receiver 361, and outputs the stream to decoder 342 as a first stream.

When a process for the recording function is started while the process for the real-time reproduction function is being performed, transform device 313 treats the stream output from receiver 361 as a first stream, and generates a second stream from the first stream in the same manner as that in Embodiments 1 to 3. Transform device 313 then stores the second stream in recording medium 412.

When performing the process for the recording function, again, transform device 313 treats the stream output from receiver 361 as a first stream, and generates a second stream from the first stream. In this case, however, determiner 13 of transform device 313 periodically outputs the direction signal for re-encoding described above while the first stream is being output from receiver 361. For example, determiner 13 outputs the direction signal at shorter intervals than the GOP of the first stream. As a result, a second stream is generated in which encoded data of reversibly compressed I pictures or P pictures are arranged at shorter intervals. Transform device 313 then stores the second stream in recording medium 412.

Determiner 13 may output the direction signal for re-encoding when a predetermined number of consecutive inter-frame encoded frames occur in the first stream. Alternatively, determiner 13 may output the direction signal for re-encoding when a particular condition is satisfied.

Recorder 411 records the second stream output from transform device 313 in recording medium 412. Recording medium 412 may be a storage device such as a memory, a hard disk drive (HDD), or a solid state drive (SSD), a removable SD memory card or universal serial bus (USB) memory, or a network attached storage (NAS) that is accessible over a network.

Reading unit 413 reads in the second stream from recording medium 412 when the recording/reproduction function is used, and outputs, to decoder 342, the encoded data of the frame at which the reproduction is to be started and the following frames of the second stream. The encoded data of the frame at which the reproduction is to be started may be an intra-frame encoded frame.

Decoder 342 decodes the stream output from transform device 313 or reading unit 413 to generate a video signal, and outputs the video signal to display unit 343.

Display unit 343 displays a video according to the video signal output from decoder 342.

Receiver 361, transform device 313, and recorder 411, and reading unit 413, decoder 342, and display unit 343 may be provided in different devices.

Such a video recording/reproduction device 410 can start recording of the received stream from a midpoint of the stream. The number of frames at which the decoding can be started can be increased by encoding an arbitrary frame in a reversible compression scheme or intra-frame encoding an arbitrary frame.

Figure 10:
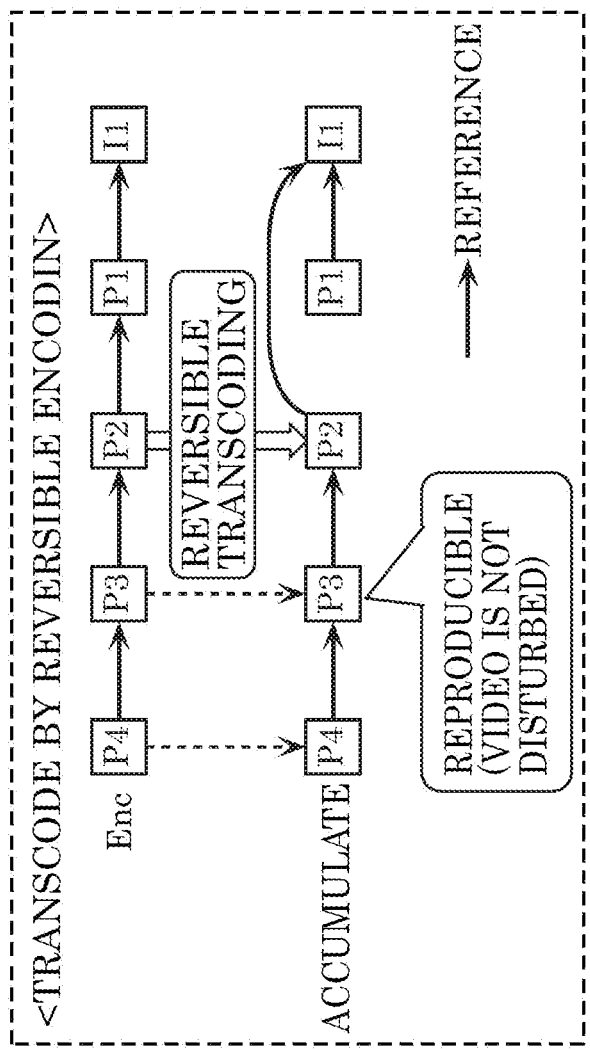
FIG. 10 is a diagram for illustrating transcoding in a reversible compression scheme according to Embodiment 7.

FIG. 10 is a diagram for illustrating transcoding in a reversible compression scheme.

As shown in FIG. 10, transform device 313 according to this embodiment transcodes irreversible encoded data P2 included in the first stream generated by encoder 312 into reversible encoded data P2. As a result, the second stream including reversible encoded data P2 is accumulated in recording medium 412.

In the transcoding, transform device 313 may change the encoded data to be referred to by encoded data P2. For example, encoded data P2 is a picture irreversibly encoded by referring to the decoded image of encoded data P1. Decoder 12a of transform device 313 decodes the irreversible encoded data P2 to generate a decoded image. Encoder 12b of transform device 313 then encodes the decoded image by reversible inter-prediction. In this process, encoder 12b performs the inter-prediction encoding by referring to the decoded image of encoded data I1 as a long-term reference data, rather than the decoded image of encoded data P1 that immediately precedes encoded data P2.

In this way, when reproducing the second stream accumulated in recording medium 412 at fast speed, for example, decoder 342 can appropriately decode encoded data P2 without decoding encoded data P1 immediately preceding encoded data P2. Furthermore, decoder 342 can appropriately decode other encoded data P3 and P4 following encoded data P2. That is, decoder 342 can appropriately reproduce the second stream by reducing the disturbance of the video.

Figure 11:
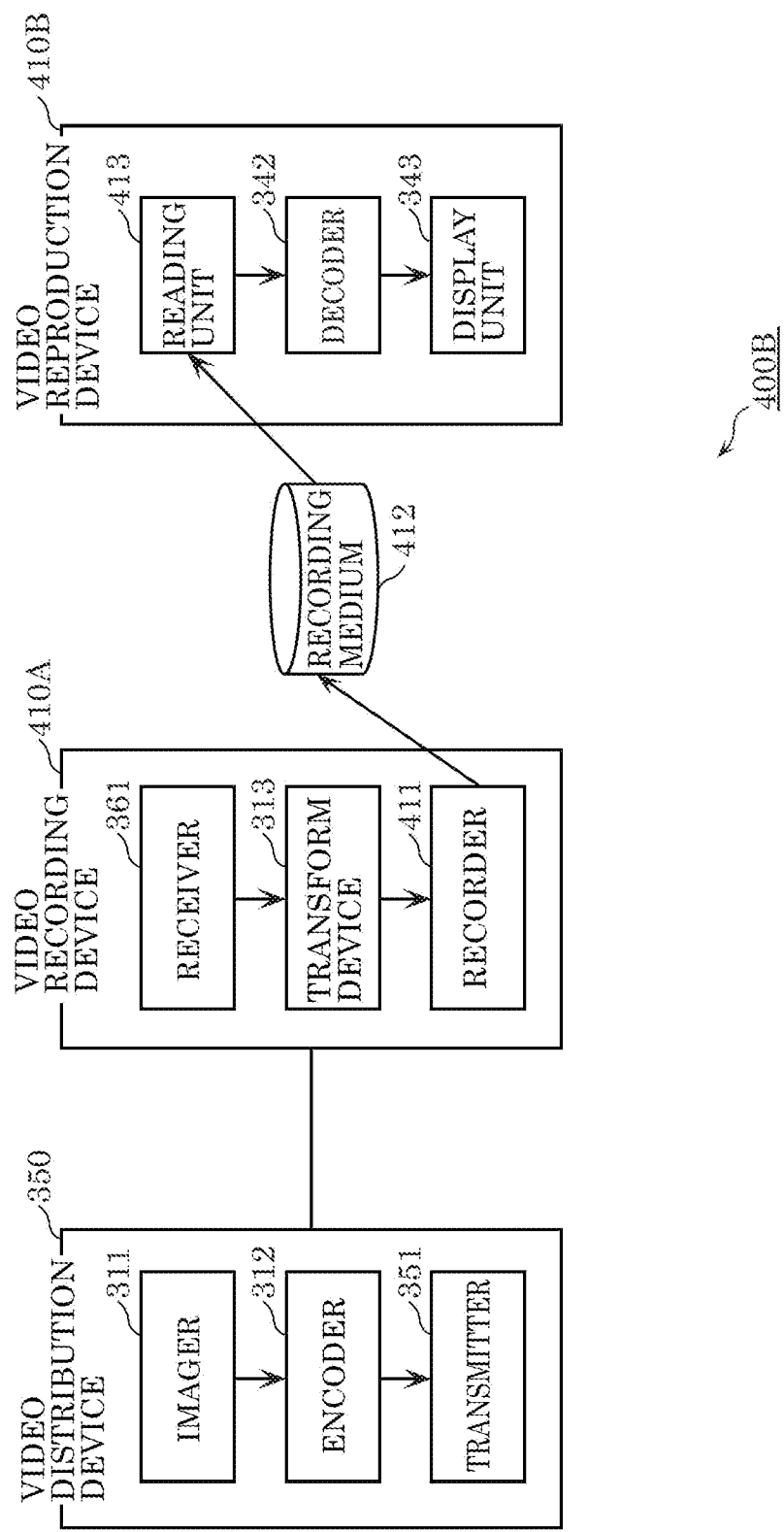
FIG. 11 is a diagram showing a configuration of another video recording/reproduction device according to Embodiment 7.

FIG. 11 is a diagram showing a configuration of another video reproduction system according to this embodiment. In FIG. 11, the same components as those shown in FIG. 9 are denoted by the same reference numerals, and detailed descriptions thereof will be omitted.

Video reproduction system 400B shown in FIG. 11 includes video recording device 410A, recording medium 412, and video reproduction device 410B, instead of video recording/reproduction device 410. Video recording device 410A includes receiver 361, transform device 313, and recorder 411. Video reproduction device 410B includes reading unit 413, decoder 342, and display unit 343. Video reproduction device 410B does not have the real-time reproduction function, although video reproduction device 410B has the recording function as with video recording/reproduction device 410 described above. Determiner 13 provided in transform device 313 of video recording device 410A may periodically output the direction signal for re-encoding described above, as with determiner 13 provided in transform device 313 of video recording/reproduction device 410. Alternatively, determiner 13 may output the direction signal for re-encoding when a predetermined number of consecutive inter-frame encoded frames occur in the first stream. Alternatively, determiner 13 may output the direction signal for re-encoding when a particular condition is satisfied. This allows the recording/reproduction of a stream to be started at a midpoint of a GOP.

Although the transform device and the decoding device according to one or more aspects of the present disclosure have been described based on embodiments, the present disclosure is not limited to the embodiments. Those skilled in the art will readily appreciate that embodiments arrived at by making various modifications to the above embodiments or embodiments arrived at by selectively combining elements disclosed in the above embodiments without materially departing from the scope of the present disclosure may be included within one or more aspects of the present disclosure.

Each of the elements in each of the above embodiments may be configured in the form of an exclusive hardware product, or may be realized by executing a software program suitable for the element. Each of the elements may be realized by means of a program executing unit, such as a CPU or a processor, reading and executing the software program recorded on a recording medium such as a hard disk or semiconductor memory.

Figure 12:
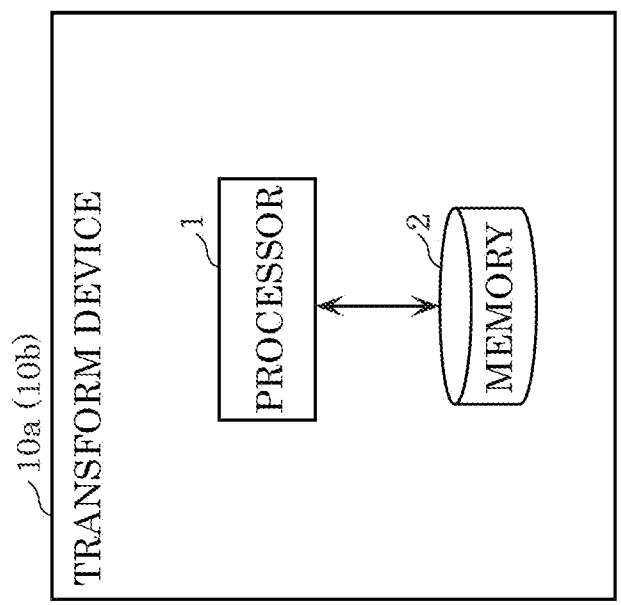
FIG. 12 is a block diagram showing another example of the configuration of the transform device.

FIG. 12 is a block diagram showing another example of the configuration of transform device 10a.

Transform device 10a includes processor 1 and memory 2. Processor 1 uses memory 2 to acquire a first stream, transforms an irreversibly encoded first picture included in the first stream into a second picture, which is a reversibly encoded picture, and outputs a second stream including the second picture. Memory 2 may store a program that makes processor 1 perform the process described above. In that case, processor 1 executes the program to perform the process described above including transformation of a picture. Alternatively, memory 2 may be used to retain the acquired first picture or may be used to retain the second picture. Transform device 10b can also have the configuration shown in FIG. 12, as with transform device 10a.

Software that implements the transform device according to the embodiments described above may make a computer perform the steps in the flowchart of FIG. 3A or 3B.

In the embodiments described above, the encoded data is data obtained by encoding a picture or a frame. However, the encoded data may be data obtained by encoding an image unit other than a picture or a frame. For example, the image unit may be a block, a slice, or a sequence.

The encoding device according to an aspect of the present disclosure may be formed by a plurality of devices. For example, the encoding device may be formed by a transmitting device that encodes an image and outputs encoded data, and a relay device. The relay device may include a transformer that receives the encoded data from the transmitting device and decodes and transcodes the encoded data, a transmitter that transmits the encoded data to a receiving device, and a receiver that receives a request signal from the receiving device.

The transform device according to an aspect of the present disclosure can be regarded as an encoding device. The encoding device includes an encoder and an output unit. The encoder generates second encoded data by performing an encoding process on a decoded image obtained by decoding first encoded data included in a first stream. Here, the first encoded data is generated by encoding a video signal, and the second encoded data corresponds to a first period. The output unit outputs a second stream including the second encoded data and encoded data corresponding to a second period following the first period. Here, the first encoded data and the second encoded data are encoded data P2 and encoded data I2 shown in FIG. 2, respectively, for example. The encoded data corresponding to the second period is encoded data P3 shown in FIG. 2, for example. The encoder and the output unit described above correspond to encoder 12b and output unit 14 shown in FIG. 1, respectively, for example.

The transform device according to an aspect of the present disclosure may be regarded as the encoding device described below. The encoding device includes an encoder. The encoder generates first encoded data by performing an inter-frame encoding process that involves referring to another frame on an image of a first frame included in a video signal. The encoder then generates second encoded data by performing an inter-frame encoding process that involves referring to the first frame on an image of a second frame included in the video signal. The encoder then generates third encoded data by performing an encoding process that uses a reversible compression scheme on the reference image corresponding to the first frame used for the encoding of the second frame. Here, the first encoded data, the second encoded data, and the third encoded data are encoded data P2, encoded data P3, and encoded data I2 shown in FIG. 2, respectively, for example. The encoder described above corresponds to first encoder 100 shown in FIG. 6, for example.

The transform device according to an aspect of the present disclosure may be regarded as the encoding device described below. The encoding device includes an encoder and an output unit. The encoder generates first encoded data by performing an inter-frame encoding process that involves referring to another frame on an image of a first frame included in a video signal. The encoder then generates second encoded data by performing an inter-frame encoding process that involves referring to the first frame on an image of a second frame included in the video signal. The encoder then generates third encoded data by performing an encoding process that does not involve referring to another frame on the reference image corresponding to the first frame used for the encoding of the second frame. The output unit outputs a first stream including the first encoded data and the second encoded data, and a second stream including the third encoded data and the second encoded data. Here, the first encoded data, the second encoded data, and the third encoded data are encoded data P2, encoded data P3, and encoded data I2 shown in FIG. 2, respectively, for example. The encoder and the output unit described above correspond to first encoder 100 and output unit 14 shown in FIG. 6, respectively, for example.

The third encoded data may be generated only in a predetermined period in response to a request from another device.

The transform device according to an aspect of the present disclosure may be a transform device that transforms an encoded video stream, and may include a determiner, a re-encoder, and an output unit. The determiner determines whether or not to transform encoded data included in an input first stream. The re-encoder re-encodes encoded data yet to be transformed, which is determined to be transformed by the determiner. The output unit outputs encoded data that is not to be transformed, which is determined not to be transformed by the determiner, and a second stream including transformed encoded data re-encoded by the re-encoder.

The re-encoder may encode an image obtained by decoding the encoded data yet to be transformed described above into intra-frame encoded data in a reversible compression scheme.

The re-encoder encodes a first image obtained by decoding first encoded data yet to be transformed into intra-frame encoded data in an irreversible compression scheme. The re-encoder may encode a second image obtained by decoding second encoded data yet to be transformed that follows the first encoded data yet to be transformed into inter-frame encoded data in a reversible compression scheme by referring to the first image.

The re-encoder may encode a first image obtained by decoding first encoded data yet to be transformed into intra-frame encoded data in an irreversible compression scheme, and encode the first image into inter-frame encoded data in a reversible compression scheme by referring to a second image obtained by decoding the intra-frame encoded data.

The determiner may determine first encoded data at which decoding is to be started to be first encoded data yet to be transformed, and determine second encoded data following the first encoded data to be encoded data that is not to be transformed.

The determiner may determine each of the first encoded data at which decoding is to be started and the one or more pieces of second encoded data following the first encoded data to be encoded data yet to be transformed, and determine the following encoded data to be encoded data that is not to be transformed.

INDUSTRIAL APPLICABILITY

The transform device, the encoding device, the video distribution system, and the video reproduction system according to the present disclosure can be applied to equipment or a system that involves encoding or decoding of data, such as a surveillance camera or a videoconference system.

What is claimed is:
1. A transform device, comprising:
a memory; and
circuitry coupled to the memory, the circuitry being configured to:
    acquire a first stream which includes a first picture that is irreversibly encoded;
    generate a second stream by transforming the first picture into a second picture that is reversibly encoded; and
    output the second stream,
wherein the second stream includes one or more pictures,
wherein the second picture is a lead picture in decoding order among the one or more pictures in the second stream, and
wherein the decoded first picture is equal to the decoded second picture.
2. The transform device according to claim 1, wherein the second stream further includes a third picture that included in the first stream, the third picture being located subsequent to the second picture in a decoding order in the second stream, the third picture being encoded with reference to a decoded image of the first picture.
3. The transform device according to claim 1, wherein the circuitry is further configured to output the first stream.

4. The transform device according to claim 1, wherein
the circuitry is further configured to determine, for each of a plurality of pictures included in the first stream, whether or not to change an encoding scheme for the picture, and
the circuitry is further configured to transform the first picture into the second picture, the first picture being a picture for which the circuitry determines to change an encoding scheme.

5. The transform device according to claim 4, wherein
the circuitry determines to change an encoding scheme for each of one or more consecutive pictures including the first picture among the plurality of pictures included in the first stream, the first picture corresponding to a timing of receiving a stream transmission request.

6. The transform device according to claim 5, wherein
the circuitry determines not to change an encoding scheme for each of pictures subsequent to the one or more consecutive pictures among the plurality of pictures included in the first stream.

7. The transform device according to claim 1, wherein
the circuitry is further configured to decode the first picture to generate a decoded image of the first picture, and
the circuitry is further configured reversibly encode the decoded image of the first picture to transform the first picture into the second picture.

8. The transform device according to claim 7, wherein
the circuitry intra-prediction encodes the decoded image of the first picture to transform the first picture into the second picture.

9. The transform device according to claim 7, wherein
the circuitry is further configured to decode a fourth picture to generate a decoded image of the fourth picture, the fourth picture being included in the first stream and being irreversibly inter-prediction encoded,
the circuitry is further configured to irreversibly intra-prediction encode the decoded image of the fourth picture to transform the fourth picture into a fifth picture,
the circuitry reversibly inter-prediction encodes the decoded image of the first picture with reference to a decoded image of the fifth picture to transform the first picture into the second picture, the first picture being inter-prediction encoded with reference to the decoded image of the fourth picture, and
the circuitry outputs the second stream including the fifth picture and the second picture.

10. The transform device according to claim 7, wherein
the circuitry is further configured to decode the first picture to generate the decoded image of the first picture, the first picture being included in the first stream and being irreversibly inter-prediction encoded,
the circuitry is further configured to irreversibly intra-prediction encode the decoded image of the first picture to transform the first picture into a fourth picture,
the circuitry reversibly inter-prediction encodes the decoded image of the first picture with reference to a decoded image of the fourth picture to transform the first picture into the second picture, and
the circuitry outputs the second stream including the fourth picture and the second picture.

11. A decoding device, comprising:
a memory; and
circuitry coupled to the memory, the circuitry being configured to:
 receive a second stream including a second picture;
 decode the second stream to generate a video signal; and
 display a video in accordance with the video signal,
wherein the second picture is a reversibly encoded picture generated by transforming a first picture included in a first stream, the first picture being irreversibly encoded,
wherein the second stream includes one or more pictures,
wherein the second picture is a lead picture in decoding order among the one or more pictures in the second stream, and
wherein the decoded first picture is equal to the decoded second picture.

12. A transforming method executed by a computer to change an encoding scheme for a picture, the transforming method comprising:
acquiring a first stream which includes a first picture that is irreversibly encoded;
generating a second stream by transforming a first picture included in the first stream into a second picture that is reversibly encoded; and
outputting a second stream,
wherein the second stream includes one or more pictures,
wherein the second picture is a lead picture in decoding order among the one or more pictures in the second stream, and
wherein the decoded first picture is equal to the decoded second picture.

13. A decoding method executed by a computer to decode a stream, the decoding method comprising:
receiving a second stream including a second picture;
decoding the second stream to generate video signal; and
displaying a video in accordance with the video signal,
wherein the second picture is a reversibly encoded picture generated by transforming a first picture included in a first stream, the first picture being irreversibly encoded,
wherein the second stream includes one or more pictures,
wherein the second picture is a lead picture in decoding order among the one or more pictures in the second stream, and
wherein the decoded first picture is equal to the decoded second picture.

* * * * *